March 17, 1959 C. H. WIKLUND 2,877,580
SLIDE VIEWER AND MAGAZINE THEREFOR
Filed Sept. 25, 1956 11 Sheets-Sheet 1
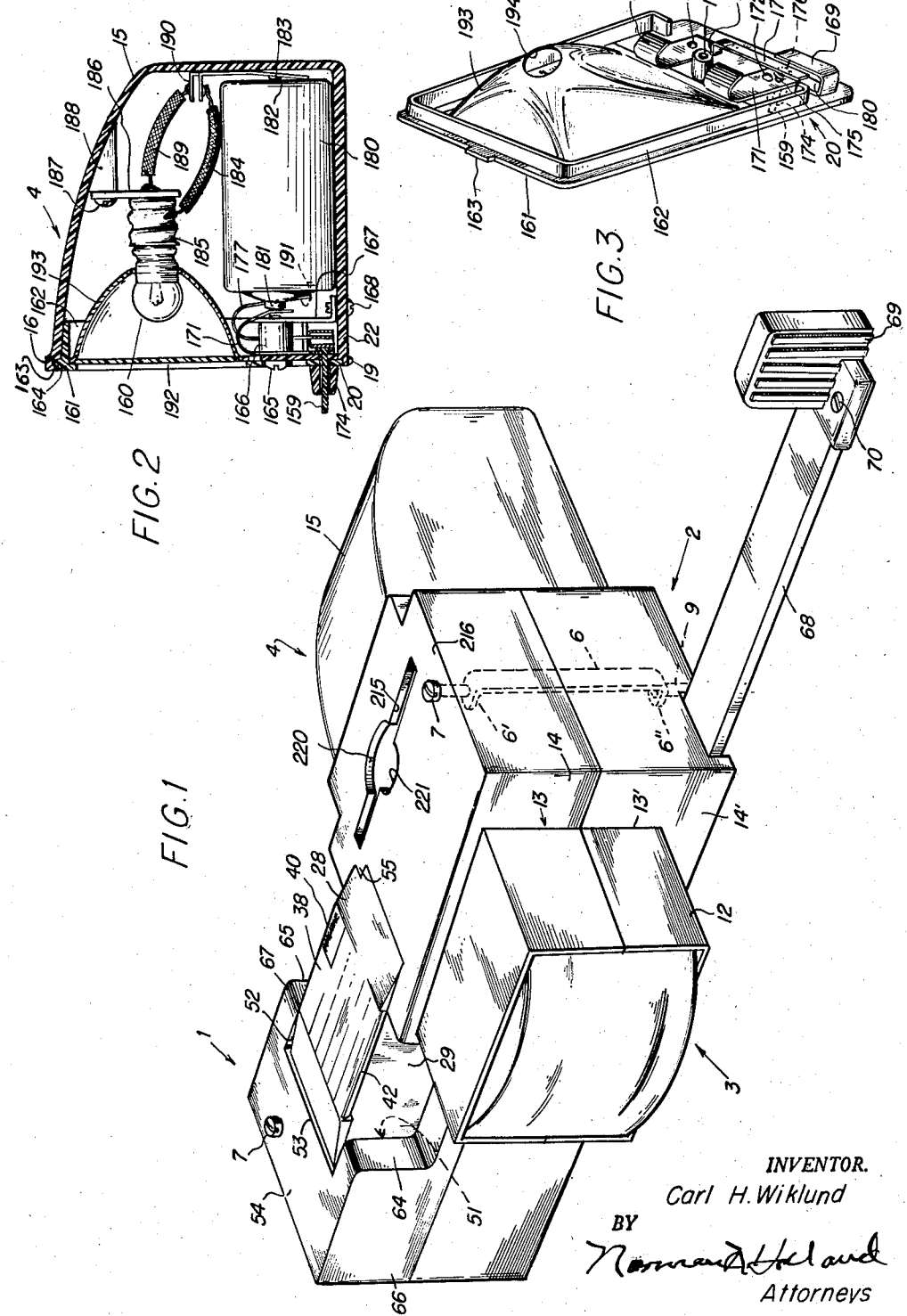
INVENTOR.
Carl H. Wiklund
BY
Attorneys March 17, 1959 C. H. WIKLUND 2,877,580
SLIDE VIEWER AND MAGAZINE THEREFOR
Filed Sept. 25, 1956 11 Sheets-Sheet 2
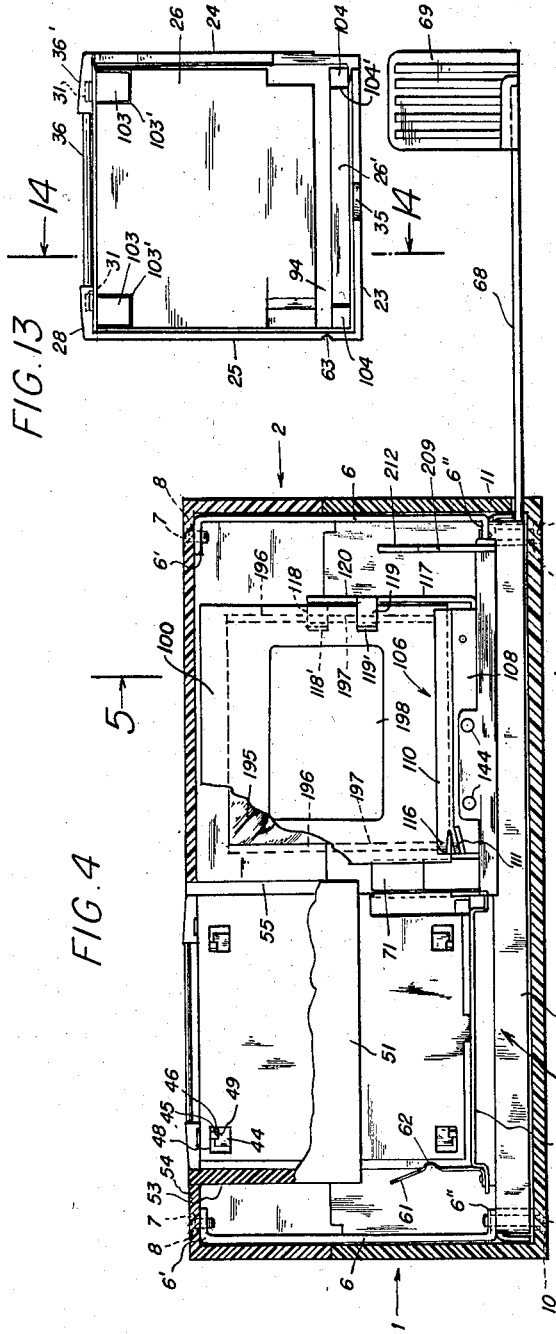
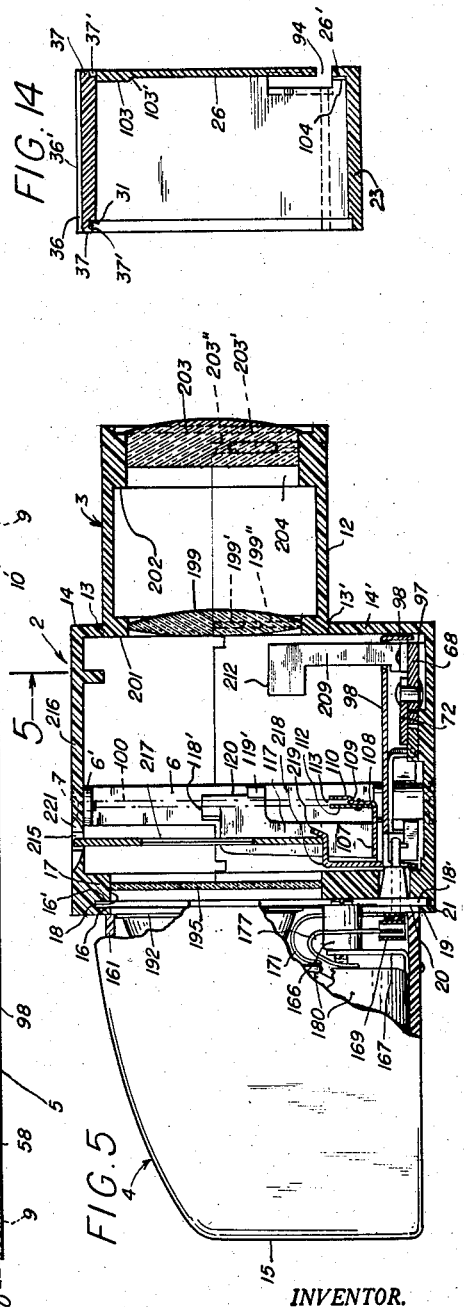
INVENTOR.
Carl H. Wiklund
BY
Attorneys

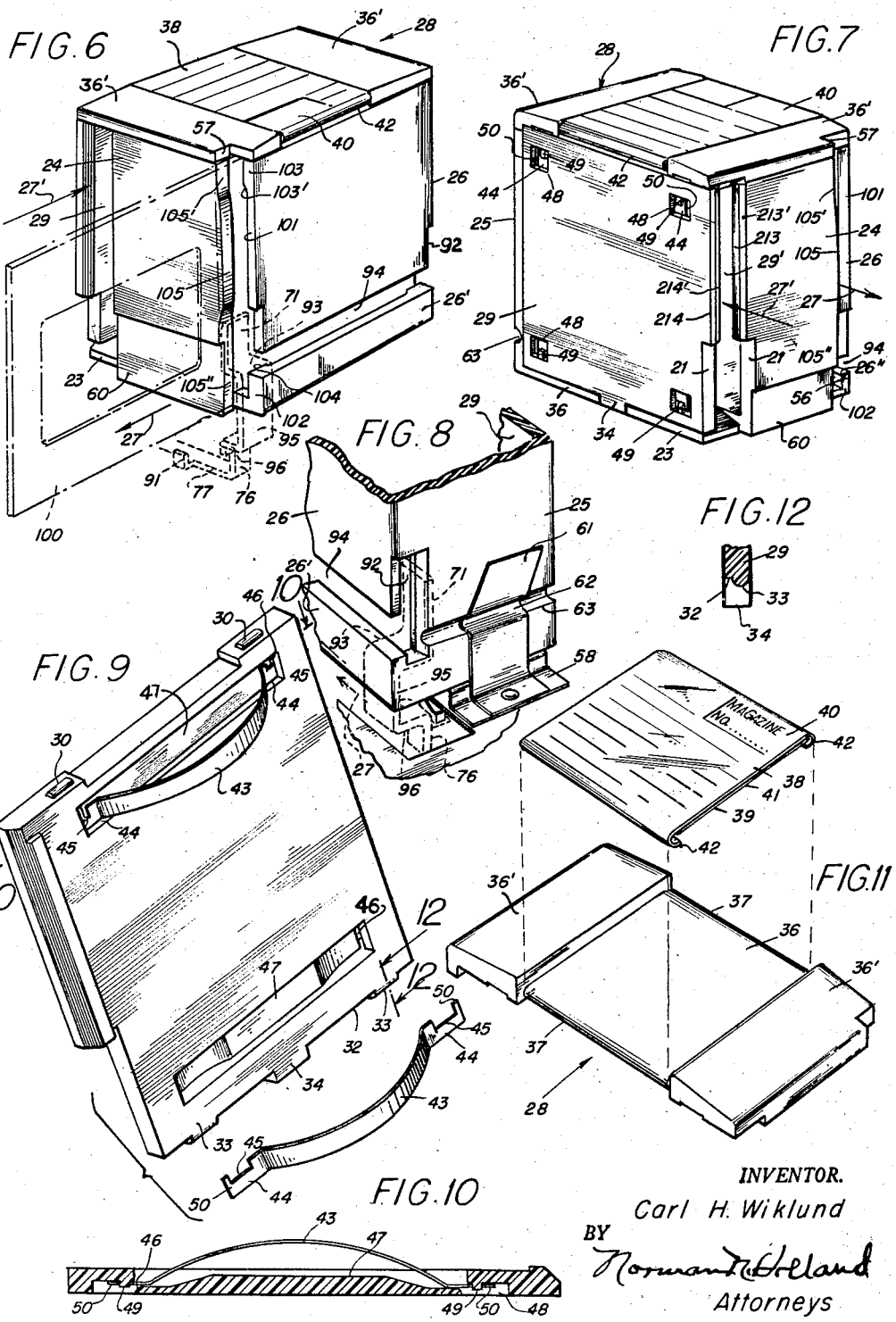

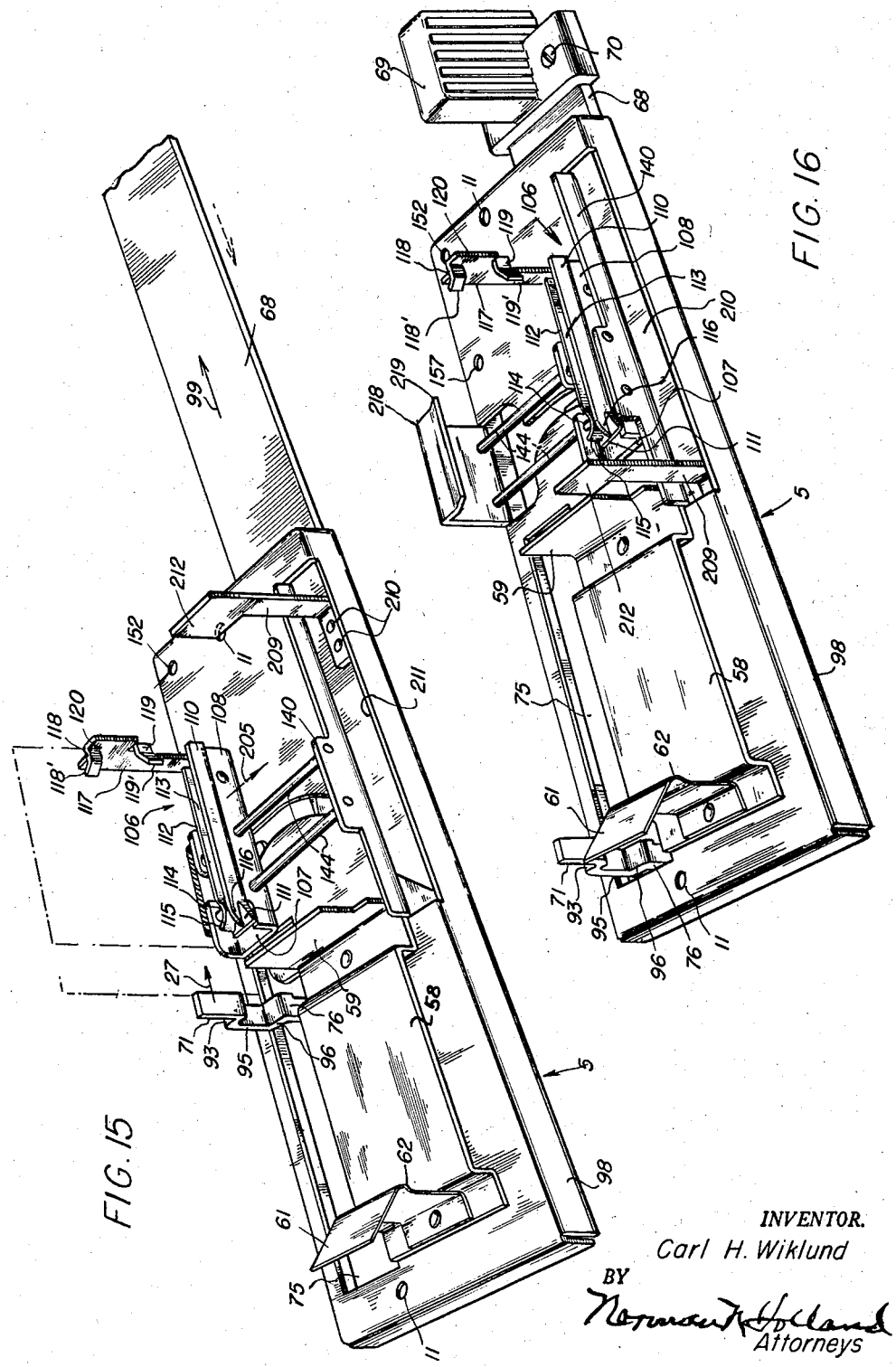

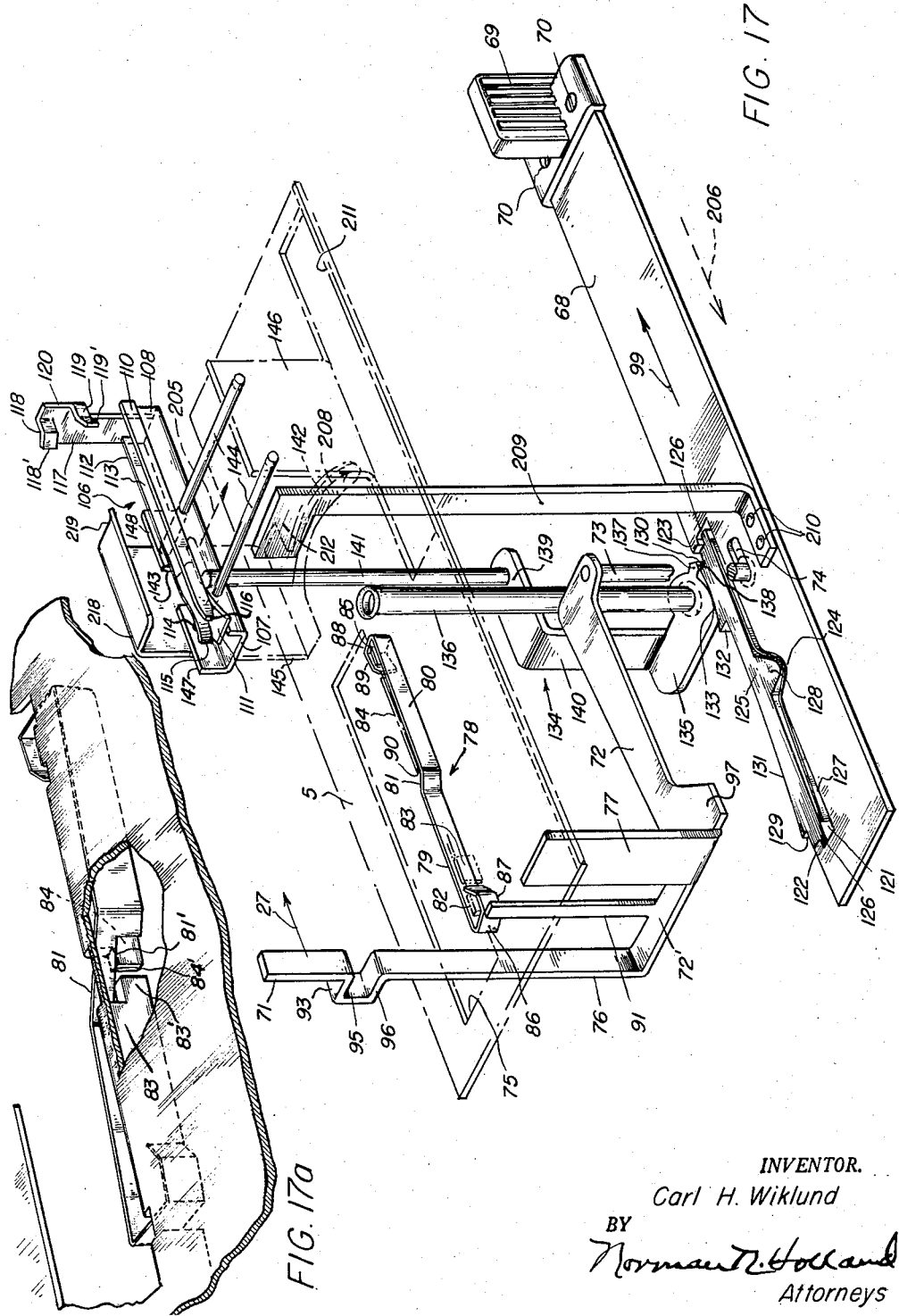

March 17, 1959   C. H. WIKLUND   2,877,580
SLIDE VIEWER AND MAGAZINE THEREFOR
Filed Sept. 25, 1956   11 Sheets-Sheet 6
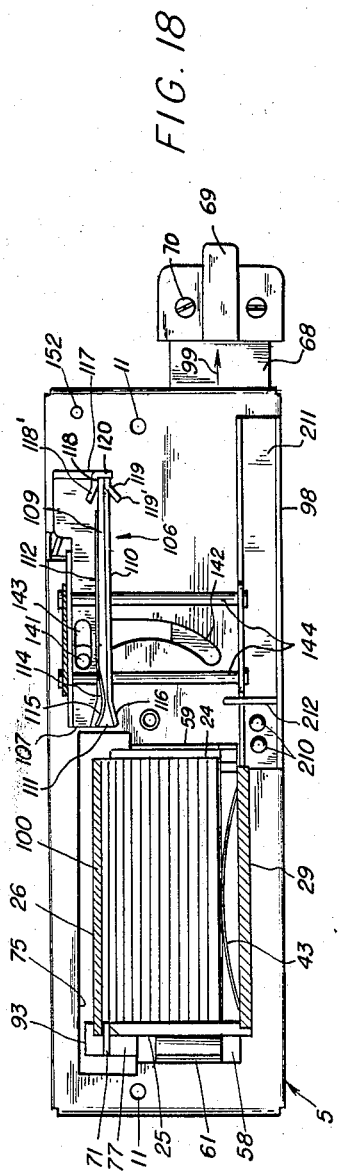
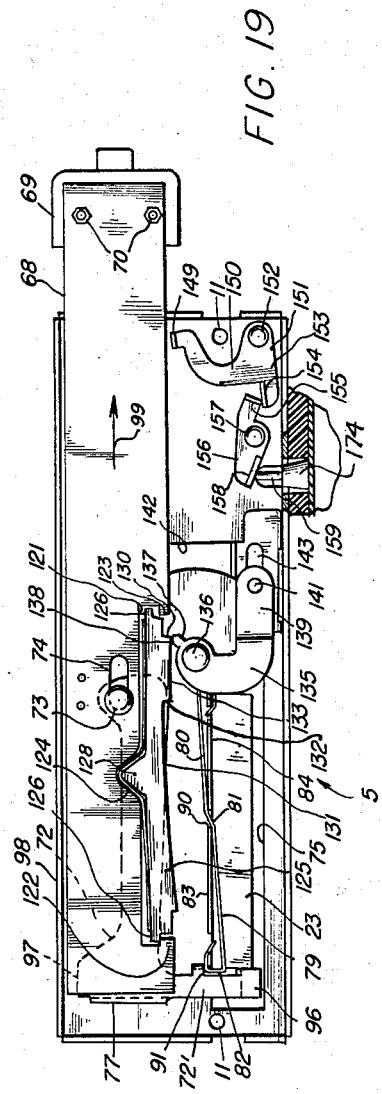
INVENTOR.
Carl H. Wiklund
BY
Attorneys

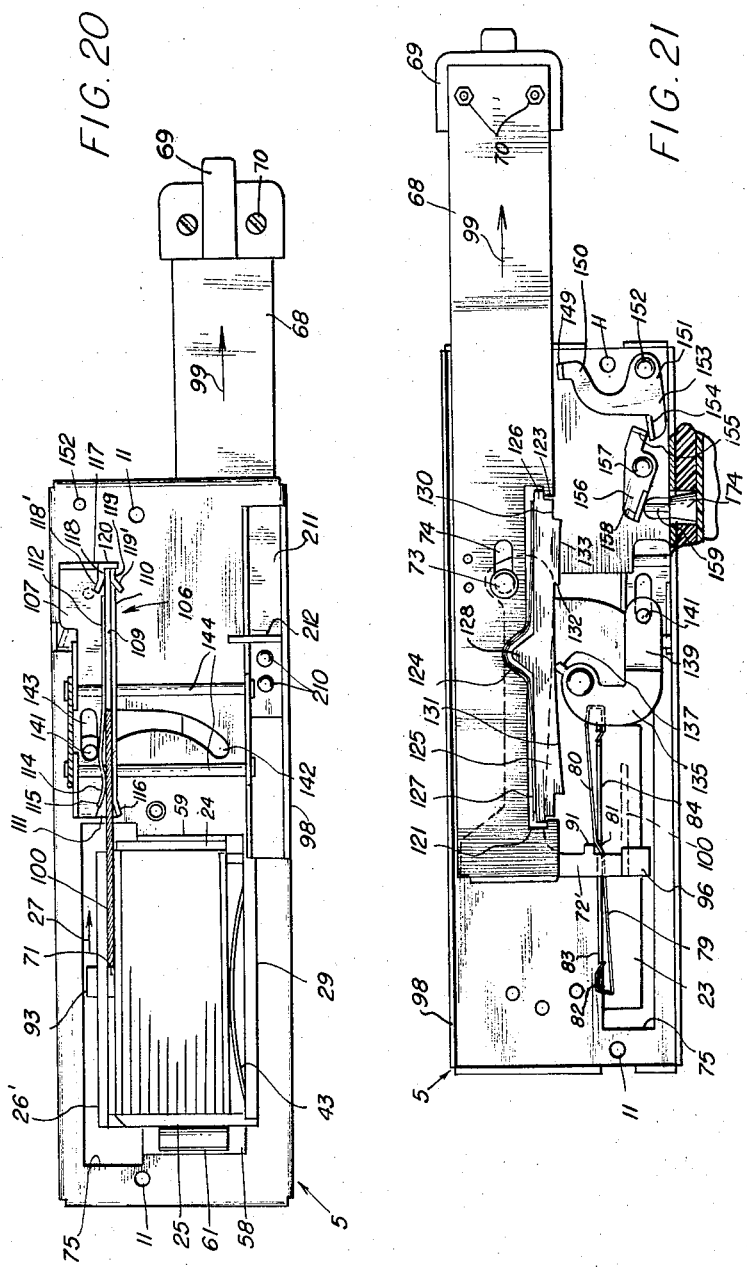

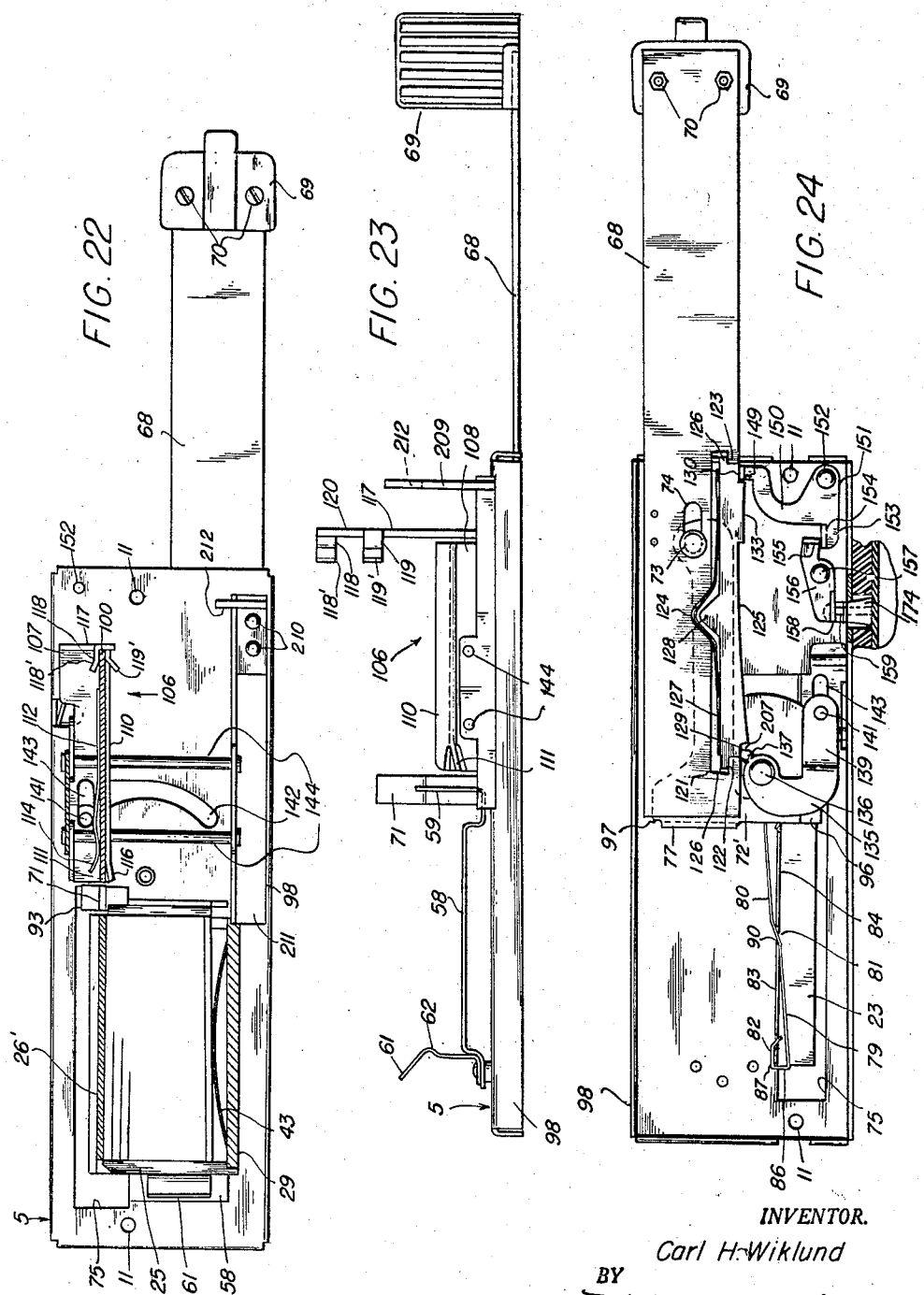

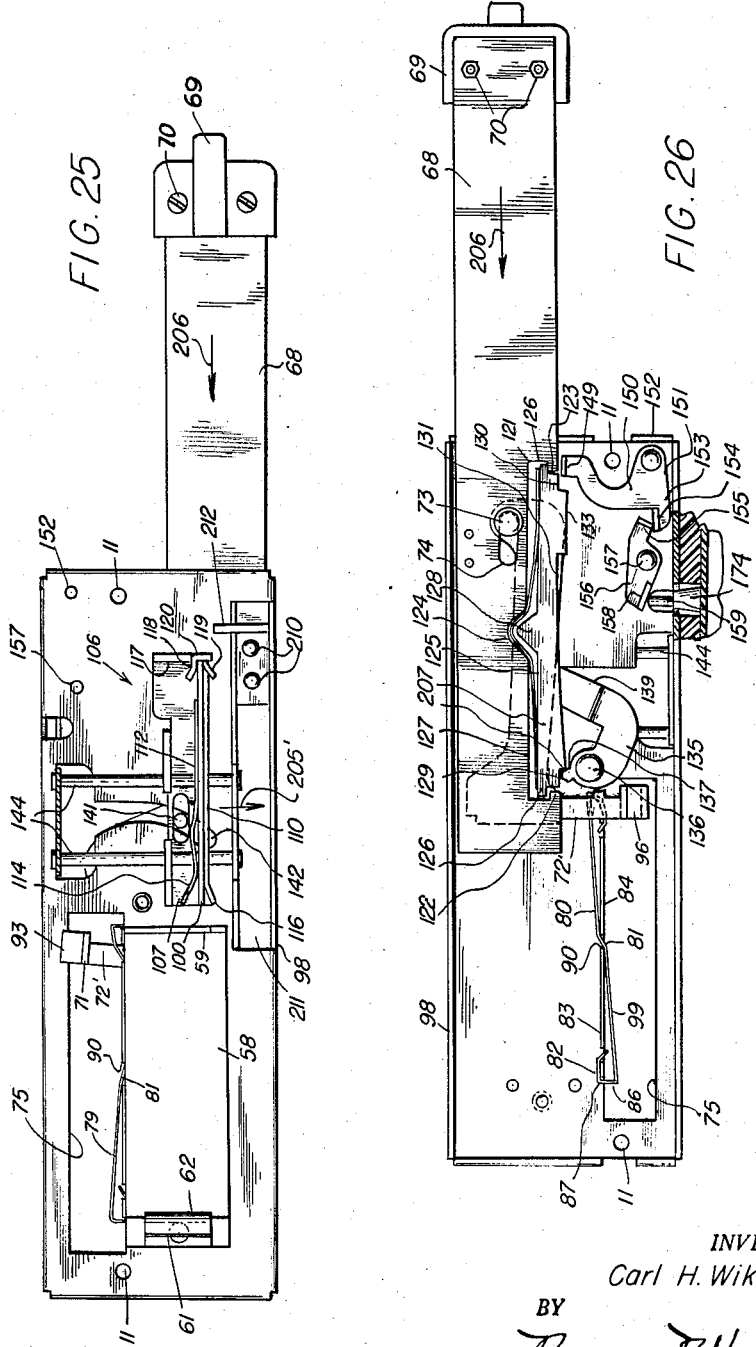

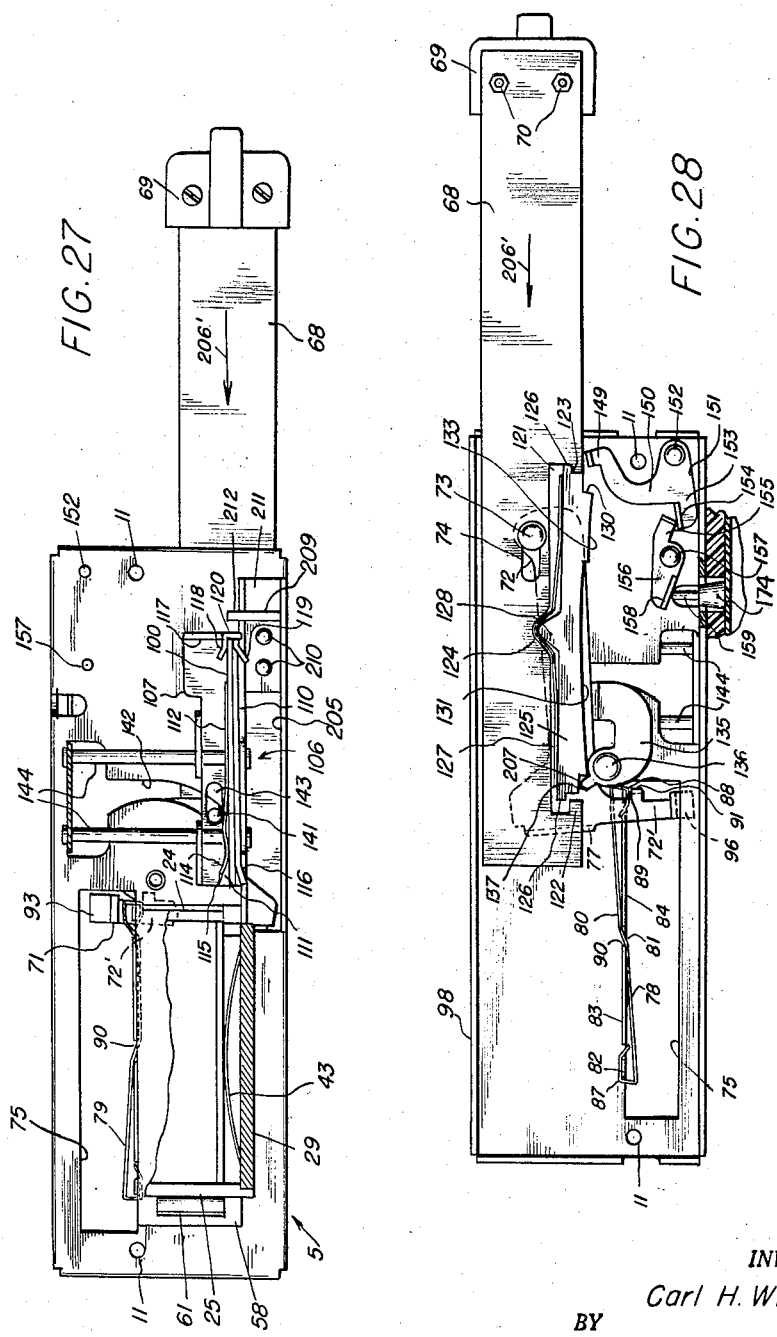

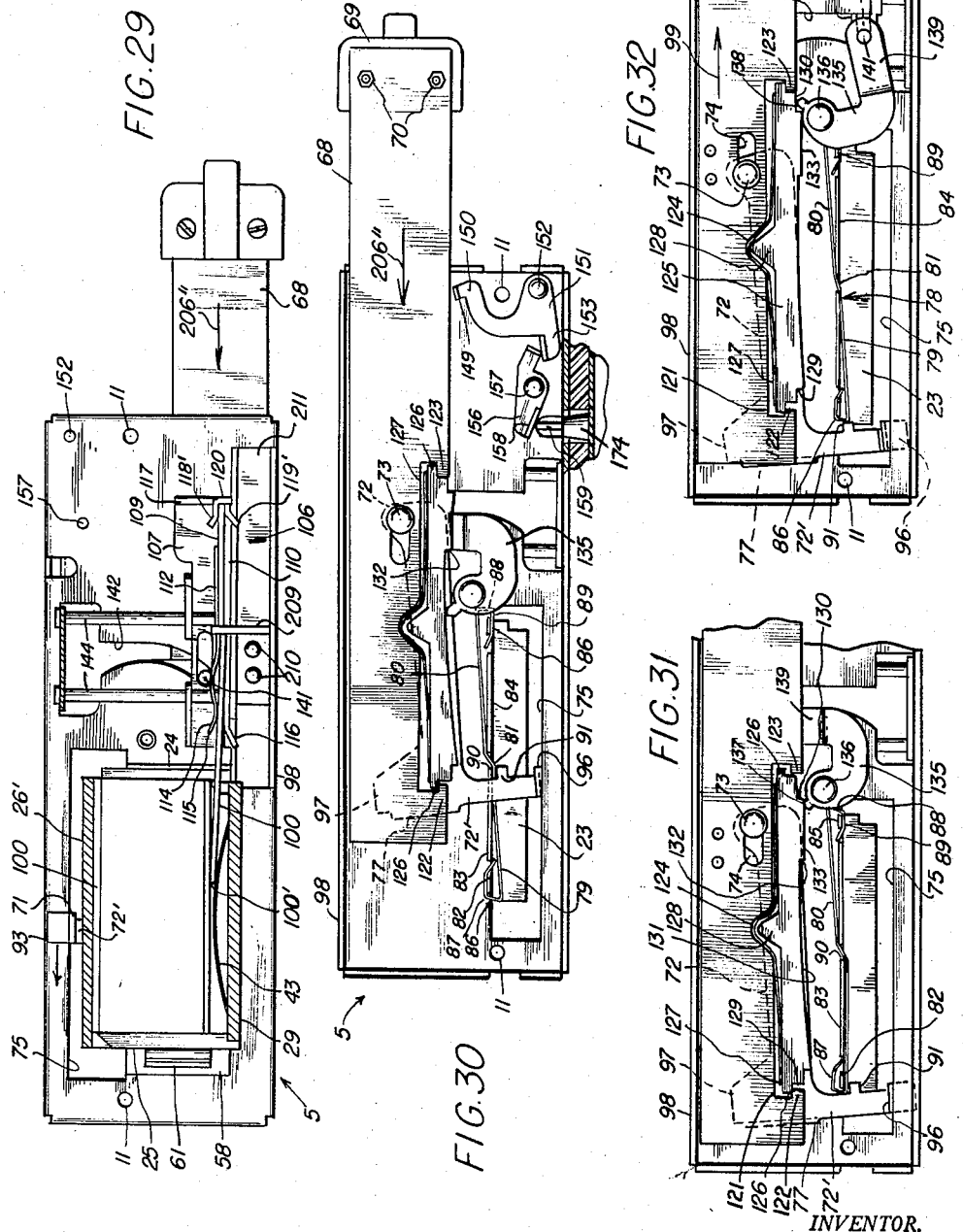

United States Patent Office 2,877,580
Patented Mar. 17, 1959

2,877,580

SLIDE VIEWER AND MAGAZINE THEREFOR

Carl H. Wiklund, New Rochelle, N. Y., assignor to Airequipt Manufacturing Co., Inc., New Rochelle, N. Y., a corporation of New York Application September 25, 1956, Serial No. 611,950

12 Claims. (Cl. 40—79)

The present invention relates to slide viewers of the type in which slides may be viewed sequentially by the simple manipulation of a slide transfer mechanism, and more particularly to an improved slide viewer which facilitates the transfer of single slides from a slide storage magazine to a viewing position, in which position illumination is automatically provided for as long as the observer desires, and then the slide is returnable into the magazine and other slides may be similarly viewed, if desired.

Colored picture slides are usually mounted in relatively thin, substantially square frames, which are made in several thicknesses, yet all of which vary only slightly in transverse dimensions. The purpose of making the slide frames of substantially the same thickness is so that they may be used interchangeably with various types of viewers. Generally, an observer of such picture slides prefers to be able to view a series of slides without manually having to insert each individual slide into the viewer. It is desirable, therefore, that a slide viewer provide for sequentially transferring a single slide from a storage compartment or magazine into a viewing position and then to return the single slide into the storage compartment and be in position to repeat this operation as often as desired.

The present invention is directed to a slide viewer embodying a number of novel and improved cooperating features which provide for ease in inserting and removing slides from the slide viewer and for efficiently transferring slides into the various positions from the storage compartment to viewing position and back into the storage compartment, while automatically providing for illuminating the slide only while in viewing position. In this improved slide viewer a novel slide transferring mechanism is provided which operatively cooperates with novel features of an improved slide magazine and an improved slide illuminating system to provide for sequentially viewing slides by a simple sliding movement of a control bar.

An object of the present invention is to provide a new and improved slide viewer.

Another object of this invention is to provide an improved slide viewer with a novel and improved slide transfer mechanism.

A further object of the present invention is to provide an improved slide viewer with an improved and novel slide magazine.

A still further object of this invention is to provide an improved slide viewer with a novel and improved slide illuminating system.

Yet another object of this invention is to provide an improved slide magazine for a slide viewer.

A still further object of this invention is to provide an improved slide viewer for observing individual slides insertable singly into the slide viewer and illuminated by an improved illuminating system.

Still another object of the invention is to provide an improved and simplified circuit breaker for the illuminating system of a slide viewer.

Further objects and advantages of this invention will become apparent upon an understanding of the following description of the illustrative embodiment or will be indicated in the appended claims, and the features of novelty which characterize this invention will be pointed out with particularity in the claims appended to and forming a part of this specification.

A preferred embodiment of the invention has been chosen for purposes of illustration and description and is shown in the accompanying drawings, forming a part of this specification, wherein:

Fig. 1 is a perspective view of an embodiment of an improved slide viewer made in accordance with this invention and shown with the slide magazine in operative position and the manually operable control bar drawn outwardly into the slide viewing position;

Fig. 2 is a side elevational view of the illuminating compartment of the slide viewer shown in Fig. 1, with a side of the compartment removed and the light reflector and electric switch push button shown in vertical central sectional views;

Fig. 3 is a perspective view of the rear of the front panel of the illuminating compartment showing the reflector and the electric push button switch, shown in Fig. 2;

Fig. 4 is a front elevational view of the slide viewer shown in Fig. 1, with the front of the slide viewer removed, with a portion of the front guide panel of the storage compartment broken away to show the slide magazine, and a portion of a slide, in viewing position, broken away to show the mounting of the translucent light diffusing screen in the rear of the viewing compartment;

Fig. 5 is a side elevational view of the slide viewer shown in Figs. 1 and 4, in which the lens chamber and the viewing compartment are shown in sectional views taken along line 5—5 in Fig. 4, and part of the illuminating compartment is broken away in order to illustrate more clearly the manner in which the illuminating compartment is secured at its upper edge to the viewing compartment and to show the electric circuit connections of the push button switch;

Fig. 6 is a perspective view of the improved slide magazine shown in Figs. 1 and 4, with a slide and one of the slide impelling fingers shown in phantom lines to illustrate the manner in which slides are pushed out of the magazine when they are transferred from the magazine on to a slide holder in the viewing compartment;

Fig. 7 is a perspective view of the slide magazine, shown in Fig. 6, showing the opposite side of the magazine from that shown in Fig. 6;

Fig. 8 is a fragmentary perspective view of the lower portion of the magazine shown in Figs. 6 and 7, illustrating the details for securing the magazine in position in the storage compartment of the slide viewer and showing, in phantom lines, the manner in which the impelling finger, shown in Fig. 6, enters the rear edge of the magazine for pushing a slide forwardly out of the magazine;

Fig. 9 is a perspective view of the inside of the closure face of the magazine, illustrating the bowed leaf springs which bias slides from this face towards the opposite face of the magazine, the lower spring being shown removed in order to illustrate more clearly details of its construction;

Fig. 10 is a sectional view taken along line 10—10 of Fig. 9, showing the manner in which the bowed leaf springs are secured in position on the closure face of the magazine;

Fig. 11 is an exploded perspective view of the top of the slide magazine shown in Figs. 6 and 7, illustrating the structural details of the top or cover and the novel slide index;

Fig. 12 is a sectional view, taken along line 12—12 of Fig. 9, illustrating a detail of the retaining bosses on the closure face of the magazine;

Fig. 13 is a side elevational view of the magazine, shown in Figs. 6 and 7, with the closure face removed;

Fig. 14 is a sectional view, taken along line 14—14 of Fig. 13, illustrating details of the closure face retaining recesses and of pads on the inside rear face of the slide magazine;

Fig. 15 is a perspective view of the slide transfer mechanism of the slide viewer shown in Figs. 1, 4, and 5 with the mechanism in the position when a slide is almost fully transferred into the slide viewing position, the edge of a slide being shown broken away in dotted lines adjacent to the impelling finger, indicating the position of a slide for this position of the transfer mechanism, and a slide, shown in phantom lines completely in viewing position on the slide holder, illustrates the manner in which it is held when in this position;

Fig. 16 is a perspective view of the slide transfer mechanism with the slide holder impelling fingers and manually operable control bar all in the position of these members corresponding to those when a slide has been re-inserted into the magazine;

Fig. 17 is a schematic vertically-extended perspective view of the slide transfer mechanism shown in Figs. 15 and 16, with the impelling fingers, manually operable trol bar, and slide holder in the position before a slide transfer stroke;

Fig. 17a is an enlarged perspective view of the spring cam mounting;

Fig. 18 is a top plan view of the slide viewer shown in Figs. 1 and 4, with the illuminating compartment, lens compartment, and top of the slide viewer and slide magazine all removed, illustrating the position of the slides in the magazine and of the transfer mechanism just prior to the beginning of the slide impelling stroke for transferring a slide from the magazine to the slide holder, corresponding to the position of the transfer mechanism shown in Fig. 17;

Fig. 19 is a bottom plan view illustrating the undersides of the slide transfer mechanism and the switch operating mechanism in the positions corresponding to those shown in Fig. 18;

Fig. 20 is a top plan view, similar to Fig. 18, with a slide partially pushed out of the slide magazine and partially into position on the slide holder;

Fig. 21 is a bottom plan view, corresponding to Fig. 19, illustrating the undersides of the slide transfer mechanism and the switch operating mechanism in the positions corresponding to the positions of these mechanisms in Fig. 20;

Fig. 22 is a top plan view, similar to Fig. 18, illustrating the positions of the slide transfer mechanism and of a slide in slide-viewing position;

Fig. 23 is a side elevational view of the slide transfer mechanism in the position shown in Fig. 22;

Fig. 24 is a bottom plan view illustrating the undersides of the slide transfer mechanism and the switch operating mechanism, corresponding to the positions of these mechanisms in the positions shown in Figs. 22 and 23;

Fig. 25 is a top plan view of the slide transfer mechanism, with a slide on the slide holder being transferred from the slide-viewing position to a position for returning a slide into the slide magazine;

Fig. 26 is a bottom plan view illustrating the undersides of the slide transfer mechanism and the switch operating mechanism, corresponding to the positions of these mechanisms shown in Fig. 25;

Fig. 27 is a top plan view of the slide transfer mechanism and the slide magazine, with the mechanism and slide on the slide holder in the positions corresponding to those just prior to the beginning of the stroke of the control bar for reinserting a slide into the slide magazine;

Fig. 28 is a bottom plan view illustrating the undersides of the slide transfer mechanism and the switch operating mechanism, shown in the positions corresponding to those of these mechanisms in Fig. 27;

Fig. 29 is a top plan view showing the slide transfer mechanism and the slide magazine, with the magazine top removed, illustrating the positions thereof with a slide approximately half re-inserted into the slide magazine;

Fig. 30 is a bottom plan view illustrating the undersides of the slide transfer mechanism and the push button operating mechanism in the positions thereof corresponding to Fig. 29;

Fig. 31 is a bottom plan view, partly broken away, illustrating the underside of the slide transfer mechanism and shows the relative positions of the slide impelling finger and follower to the spring cam, in the position thereof subsequent to that shown in Fig. 30 and just prior to the end of the return travel of the control bar; and Fig. 32 is a bottom plan view, partly broken away, illustrating the underside of the slide transfer mechanism, showing the relative position of the slide impelling finger and its related spring cam and the position of the rocker cam and Scotch yoke crank, corresponding to the positions thereof just prior to the final return of the slide holder to its slide viewing position and the return of the impelling finger to its starting position for initiating the transfer of a slide from the slide magazine to the slide holder.

Certain improvements of the present invention may be utilized with various different types of slide viewers and other devices, but, for convenience of description and illustration, they will be described and shown in connection with a new and improved slide viewer embodying certain novel and improved features applicable specifically to the type slide viewer disclosed in this application as illustrative of the entire invention.

General casing structure

Referring to the drawings this invention is illustrated in connection with a slide viewer of the type provided with a storage compartment 1 for a plurality of picture slides, a viewing compartment 2 in which the slides may be viewed one at a time, a lens compartment 3 for magnifying the pictures, and an illuminating compartment 4 for providing the desired light for more clearly viewing the slides. These four compartments are shown in their assembled relationship in Fig. 1 and may be conveniently formed of molded plastic combined to form a relatively rugged casing for the slide viewer. As shown in this figure, the storage compartment 1 and the viewing compartment 2 are formed of two sections. The upper of these sections for both compartments may conveniently be made as a single plastic molding, and the lower sections for both compartments may similarly be made of a single plastic molding. This provides a rugged central casing for the slide viewer, which can be secured together by a relatively simple rigid framework requiring a minimum of parts.

A supporting base 5, preferably formed of relatively thin metal plate, is adapted to provide the major support for the operating mechanism of the slide viewer and extends across the bottom of both the storage compartment 1 and the viewing compartment 2, as is more clearly shown in Fig. 4. The upper section of the storage compartment 1 and of the viewing compartment 2 and the lower section of these two compartments are rigidly secured together by any suitable means, such as a pair of U-brackets 6. These brackets are arranged adjacent to the outer side walls of these two sections and are secured to the upper section by screws 7, which extend through apertures 8 in the upper side of the upper section and threadedly engage inturned legs 6' of the U-brackets 6. These U-brackets 6 demountably secure together the two sections of the storage and viewing compartments and also fasten the supporting base 5 in position by screws 9, which extend through apertures 10 in the lower side of the bottom section of the storage and viewing compartments, through apertures 11 in the supporting base 5, and threadedly engage tapped openings in lower inturned legs 6" of the U-brackets 6.

Removal of both screws 7 provides for the removal of the upper section from the lower section and enables the removal of foreign substances from and cleaning of the interior of the storage and viewing compartments, without disturbing the operating mechanism of the slide viewer. When it is desired to clean the operating mechanism of the slide viewer more thoroughly than by simply blowing out the dust or lifting out foreign particles from the top of the slide viewer, the two screws 9 may be removed so as to release the lower section of the storage and viewing compartments from the upper section and simultaneously release the supporting base 5 from the retaining U-brackets 6. The operating mechanism can then be removed from the casing and completely disassembled for cleaning or repair.

The lens compartment 3 comprises a box-like lens mounting casing 12. The casing 12 is preferably molded in upper and lower sections with the upper portion formed integrally with the upper portion of the viewing compartment and with the lower portion molded integrally with the lower portion of the viewing compartment. Suitable magnifying lenses such as lens 199 and lens 203 have bosses 199' and 203', respectively, at their edges which position the lenses in vertical slots 199" and 203", respectively, in the lower portion of casing 12. Stops 201 and 202 on the upper portion of the casing 12 hold the lens in position in slots 199" and 203" when the upper portion of the casing 12 is in position.

The illuminating compartment 4 preferably is formed as a cup-shaped casing 15 of any suitable material, such as molded plastic, with an upwardly extending flange 16 adjacent to the top front edge thereof. This flange 16 is adapted to form a locking engagement with a groove 16' formed in a downwardly extending flange 17 on the rear top edge of an aperture 18 in the rear side of the upper section of the viewing compartment 2, as shown more clearly in Fig. 5. The illuminating compartment 4 may be secured rigidly to the rear side of the viewing compartment 2 in any suitable manner, as by a snap latch boss 19 formed on the lower edge of the front 20 of the illuminating compartment engageable in complementary recesses in the rear edge of the bottom 21 of the viewing compartment or by set screws extending therethrough and engaging the front edge of the underside 22 of the illuminating compartment which extends into an aperture 18' in the rear of the lower section of the viewing compartment 2.

In order to facilitate the viewing of a slide, it is desirable that the slide viewer be provided with a removable slide storage magazine which may be easily replaced with other similar magazines containing other series of slides, so that a viewer may enjoy seeing a large number of slides without the necessity of arranging groupings of individual slides in the storage compartment each time that a group has been viewed and removed. Such an improved storage magazine is provided in the illustrated slide viewer and includes a box-like structure formed of any suitable material, such as molded plastic. This box-like structure or magazine casing includes a bottom 23 integrally molded with two opposed upwardly extending sides 24 and 25 and a rear face formed of upper and lower sections 26 and 26', respectively. A top or cover 28 secures together the upper ends of the sides 24 and 25 and of the rear face 26. This magazine casing forms a substantially closed storage compartment for a group of picture slides, which may or may not be related, at the option of the person who makes the grouping of these slides.

In order to facilitate the arrangement of such a group of slides in the storage magazine, it is provided with a removable closure face 29, which can be placed in position or removed from the casing by respectively simply snapping it into position or prying it loose with one's fingernail. This snap-latching of the closure face 29 is provided by a pair of arcuate section bosses 30 formed on the upper edge of the face 29 which are insertable into complementary recesses or sockets 31, Fig. 13, formed in the underside of the cover 28. The opposite or lower edge 32 of the closure face 29 is formed with two relatively small arcuate section bosses 33 adjacent the outer ends thereof which are adapted to engage complementary recesses formed in the inner surface of the bottom 23 of the magazine. The lower edge 32 of the closure face also is formed with a tongue 34, substantially centrally thereof, which is adapted to engage a complementary notch 35 formed in the front edge 36 of the bottom 23 of the magazine to correctly orient closure face 29 on the magazine. This closure face 29 snaps into position by a simple pressure on the lower edge thereof which presses the bosses 33 into latching engagement with their complementary recesses in the magazine bottom 23 and seats the tongue 34 in its complementary notch 35. Opening of the magazine for any purpose whatever, such as to rearrange the sequence of a stack of slides therein, or simply to place slides in the magazine or to remove them therefrom, is readily accomplished by gripping the closure face 29 at its exposed edge 214 and by pressing it outwardly, thus unlatching the bosses 33 from their recesses in the magazine bottom 23 so that the closure face 29 may be lifted from the magazine casing.

In this improved magazine, provision is made for indexing the picture slides and indicating the order in which the slides are sequentially arranged by providing the top or cover 28 of the magazine with a slightly depressed central section surface 36 and slightly indented and inwardly curved edges 37 on each side of, and coextensive with, the central surface 36 to provide for attachment thereto of a readily removable index and protective sheath 38. The index preferably is formed of any suitable sheet of lined paper 39 with a magazine number box 40, which may be used in connection with a master card or book index in which a series of magazines may be suitably cataloged. The paper index 39 is adapted to be placed under the sheath 38, which is preferably formed of a thin sheet of transparent plastic, with a relatively narrow inturned side edge 41 for retaining the index paper 39 in position under the sheath. The top and bottom edges 42 of the sheath are curved inwardly on the same curvature as the edges 37 of the magazine cover 28, so that they can be snapped into relatively shallow longitudinally extending grooves 37' formed on the under side of the cover 28 substantially co-extensive with the central depressed section 36 and adjacent to the edges 37, so as to securely latch the index in position. In this position the outer surface of the plastic sheath is substantially flush with the outer surfaces of the ends 36' of the top 28, and the index sheet is securely sealed in easy viewable relation on the magazine under the transparent sheath. This provides a simple, smooth plastic surface for all of the exterior of the cover and minimizes damage to the index, while providing for readily correcting the listing or for substituting a new index sheet.

Picture slides are adapted to be stacked in the storage magazine with the top of the picture slides adjacent to the top 28 of the magazine and the bottom of the picture slides adjacent to the magazine bottom 23 and substantially parallel to the rear magazine face formed by the magazine sections 26 and 26'. In order to maintain the picture slides in the desired stacked position for proper passage to and from the storage magazine, as indicated by arrows 27 and 27', respectively, Figs. 6 and 7, into and from the viewing compartment, the closure face 29 is provided with a pair of bowed leaf springs 43 for biasing the stacked slides from the closure face towards the rear face of the magazine. These springs preferably are formed of relatively thin resilient metal, such as sprung steel or berillium-copper, with the medial portion of the springs of a bowed or semielliptical configuration terminating in aligned outwardly extending ends 44. These springs are adapted to be removably mounted on the closure face 29 and are formed and mounted to provide for longitudinal extension and resultant variation in the bowed depth thereof, so as to maintain a desired pressure against the stacked slides in the magazine, both when the magazine is completely filled with a predetermined number of slides and when one or more of these slides has been removed from the magazine. In this manner the bowed springs will maintain the slides properly stacked even though the magazine does not contain a full complement of slides and also during the time when one of the slides is in the viewing compartment.

In order to provide for this relative change in the bowed depth of the springs 43, each end 44 of these springs is formed with a longitudinally extending notch 45 in an edge thereof, which is adapted to be suitably secured to the closure face 29 to provide for relative longitudinal movement of the ends of the springs towards and away from each other. In the illustrated embodiment of this feature of the present invention, the closure face 29 is formed with a pair of apertures 46 adjacent to the upper edge and a second pair of apertures 46 adjacent to the lower edge thereof, with a guide slot 47 extending longitudinally between each pair of apertures. A pair of recesses 48 are formed on the opposite surface from each of the pairs of apertures 46 in communication therewith, and a stop 49 is formed on the bottom of each recess to provide for latching engagement with the notches 45 in the ends 44 of the springs 43, Fig. 4. As is more clearly shown in Figs. 9 and 10, the outer edges 50 of the ends 44 of the springs 43 are inserted through the apertures 46 and over the stops 49, with these stops 49 arranged in the notches 45. The stops 49 are relatively narrower than the length of the notches 45, so as to provide for movement of the ends of the springs relative to the stops 49. This allows the two ends 44 of a spring to move outwardly as the medial bowed section of the spring 43 is compressed and to move inwardly as pressure is released on the center of the bowed section of the spring, thus enabling the spring freely to adjust its bowed depth in accordance with the number of slides in the magazine.

The slide magazine is adapted to fit snugly into the storage compartment 1 between front, rear, and outer side guide panels 51, 52, and 53, respectively, in the storage compartment. These guide panels may conveniently be formed as plastic panel elements unitarily molded with, and extending downwardly from, the upper side 54 of the storage compartment.

In order to assure the proper positioning of the magazine in the storage compartment, an offset aligning guide strip 55 is molded on the inner corner of the rear guide panel 52 and is adapted to cooperate with a complementary offset in the magazine structure. This complementary offset in the magazine structure includes a notch 56 which is formed in the inner rear corner of the bottom of the magazine, the formation of the upper and lower sections 26 and 26' of the rear face of the magazine slightly shorter than the total length of the magazine, and a notch 57 formed on the rear corner of the top 28 of the magazine.

A magazine positioning clamp, formed with a base 58, is mounted on the main supporting base 5 and is formed with an inner clamping flange 59, which fits snugly against a complementary inset surface 60 on the lower edge of the inner side 24 of the magazine. A resilient leaf spring 61 extends upwardly from the opposite end of the positioning clamp base 58 and is formed with an inwardly extending ridge 62, which is adapted to engage a complementary groove 63 formed on the outer side 25 of the magazine adjacent to the lower edge thereof. This engagement of the spring ridge 62 with the magazine groove 63 serves to provide for resiliently latching or clamping the magazine in the storage compartment. The curvature of the groove 63 and of the ridge 62 and the resiliency of the spring 61 provide for readily inserting and removing the magazine from its latched position in the storage compartment. In order further to facilitate the removal of a magazine from the storage compartment, a pair of finger grip openings 64 and 65 is formed in the front and rear faces 66 and 67 of the upper section of the storage compartment and in the front and rear guide panels 51 and 52, respectively, to provide for more firmly gripping the sides of a magazine when inserting and removing it from the storage compartment.

*Transfer mechanism for placing slides in viewing position*

In order to provide for sequentially viewing single slides, an improved slide transfer mechanism is provided, which is operable to transfer slides from within the slide magazine into a viewing position in the viewing compartment and to return such a slide into the opposite side of the slide magazine by a simple longitudinal sliding movement of a control bar 68. This control bar is operable by an upwardly extending finger grip 69, suitably secured, as by a pair of screws 70, to the outer end of the control bar 68.

Details of this slide transfer mechanism are illustrated in Figs. 15 through 32, which also illustrate various positions of the transfer mechanism during its operating operation. This slide transfer mechanism includes an impelling finger 71, which is adapted to extend into the slide magazine for pushing slides forwardly out of the magazine as indicated by arrows 27. This action of the impelling finger 71 requires that the finger pass through the inside of the slide magazine during its forward stroke in pushing a slide out of the magazine and then that it return outside of the magazine to its initial impelling position, as indicated in Fig. 8.

Actuation of the impelling finger 71 is provided by a suitable driving connection between the finger and the control bar 68, and includes a crank 72 which is pivotally secured by a lost-motion connection to the control bar 68. This lost-motion connection comprises a driving pivot pin 73 which is riveted to the crank 72 and is operatively connected to the control bar 68 by extending through a longitudinally extending slot 74 therein. The impelling finger 71 projects downwardly through a longitudinally extending slot 75 in the supporting base 5 and includes a lower portion 76, which is secured to the transversely extending arm 72' of the crank 72. An upwardly extending guide finger 77 is secured to the crank arm 72' adjacent to the elbow of the crank 72 and is adapted to engage the underside of the top of the supporting base 5, so as to maintain the crank 72 spaced from the supporting base 5 during the operation of the slide transfer mechanism.

The desired travel of the impelling finger 71 is governed by a spring cam 78, formed with two relatively long longitudinally extending sections 79 and 80 connected together by an angularly extending section 81 arranged around a downwardly projecting set of flanges 82, 83, 84, and 85 formed on the inner edge of the slot 75 and conveniently made integral with the top of the supporting base 5. As is more clearly shown in Fig. 17, the spring cam 78 is arranged with the longitudinal extending spring cam section 79 on the outside of flange 83 and extending into slot 75, with the cam sections 86 and 87 bent around the flange 82. These sections of the spring cam 78 are connected to the other sections of the spring cam by the angularly extending spring cam section 81, which passes through a slot 90 between the flanges 83 and 84; and the longitudinally extending spring section 80 is arranged under the top of the supporting base 5 on the inner side of the flange 84, with the spring cam end sections 88 and 89 extending around the flange 85. Fig. 17a shows the details of a preferred means for anchoring the spring cam 78 in place by forming cutout 81' therein and by providing projections 83' and 84' on flanges 83 and 84, respectively. The angles of the spring cam 78 and its resiliency are such as to bias the spring section 79 outwardly into the slot 75, with the spring cam section 87 normally engaging the inner side of the flange 82; while the longitudinally extending spring cam section 80 is biased inwardly away from the flange 84, with the spring cam section 89 normally biased against the flange 85. The angle of the spring cam section 81 is such as to provide a firm binding of the inner and outer surfaces of the adjacent ends of the spring cam sections 79 and 80 with the edges of the flanges 83 and 84 adjacent to the slot 90, so as to provide a secure mounting of the spring cam 78 upon the supporting base 5 while providing for relative in and out movement of the ends of the spring cam.

The impelling finger 71 is guided in its movement along the spring cam 78 during its slide impelling stroke through the slide magazine and during its return travel to its initial slide impelling position by a follower finger 91, which extends upwardly from the transfer crank arm 72' to engage with the spring cam arm 78. The length of the follower finger 91 preferably is such that the upper end of the follower finger is in sliding engagement with the underside of the top of the supporting base 5 as it travels under the supporting base during the travel of the impelling finger 71 in proper alignment relative to the slide magazine and to the slides within the magazine.

As is more clearly shown in Fig. 8, the slide magazine is formed with a slot 92 adjacent the rear outer corner thereof, by a depressed portion on the lower corner of the rear upper face 26 and on the outer side 25, to provide for the entrance of the impelling finger 71 into the slide magazine at the rear outer edge thereof. The impelling finger 71 is formed with a U-section portion which connects it to the lower end 76, and which is adapted to extend around the lower section 26' of the rear magazine face, as the impelling finger travels through the magazine. This U-section portion of the impelling finger includes an upper leg 93, which is adapted to project through a longitudinally extending slot 94 between the adjacent edges of the upper and lower sections 26 and 26' of the rear magazine face, while a base portion 95 connects the upper leg 93 to a lower leg 96 and through it to the lower end 76 of the impelling finger. This provides for free movement of the finger 71 while pushing a slide out of the slide magazine and also provides for its free retraction during its return stroke through the slot 75. In order further to assure proper alignment of the impelling finger 71 with a slide in the slide magazine during its slide impelling travel, the crank 72 is formed with a guide section 97 adapted to have a sliding engagement with the inner surface of the front side wall 98 of the supporting base 5, as is more clearly shown in Fig. 19.

In order to place a slide in viewing position, the finger grip 69 on the control bar 68 is pulled outwardly, Figs. 17, 18, and 19, so as to draw the control bar 68 as indicated by the arrows 99. Such movement of the control bar 68 will first move the control bar from the position shown in Fig. 16 to the position shown in Fig. 32, which movement has no effect upon the crank 72 and its connected impelling finger 71, as the control bar 68 is connected to the crank 72 by the pivot pin 73 which extends through the longitudinally extending slot 74 in the control bar 68. This initial movement moves control bar 68 relative to the pivot pin 73, so that its position in the slot 74 is shifted from the end thereof adjacent the finger grip 69 to the opposite end of the slot but does not move the pin 73. A slight additional movement places the slide transfer mechanism in a position for transferring a slide from the magazine into the viewing compartment and brings the control bar 68, the pivot pin 73, the crank 72, and the impelling finger 71 in the positions shown in Figs. 17, 18, and 19, with the follower finger 91 adjacent to the inner corner of the end cam surface 87. Further outward movement or pull on the finger grip 69 moves the control bar 68 outwardly from the slide viewing compartment into a position such as that shown in Figs. 20 and 21. During this movement of the control bar 68, the slide impelling finger 71 engages the rear edge of a slide 100 so as to push it out of the slide magazine through a withdrawal slot formed along the inner rear edge of the slide magazine. This withdrawal slot is formed between the inner edges 101 and 102 of the upper and lower sections 26 and 26' of the rear face of the magazine and the adjacent rear edge of the inner side 24 of the magazine. This slot is more clearly shown in Fig. 6 in which the slide 100 is shown in phantom lines.

At times, the picture slides may be slightly bowed so that the total transverse distance between the inner upper and lower edges of a slide and the outermost opposite surface of the slide will be somewhat greater than the actual thickness of a slide. In order to allow the passage of such slightly bowed slides out of the magazine, it is necessary that the withdrawal slot be wider than the actual thickness of a picture slide. It is also necessary that the transverse width of the withdrawal slot be less than the thickness of two picture slides in order to assure against wedging or jamming of picture slides in the withdrawal slot and to provide a slot which will not only accommodate the withdrawal of a slightly bowed slide but will also provide for the withdrawal of slides of slightly varying thicknesses.

Provision is made for assuring against the jamming of slides in the withdrawal slot by providing upper spacing pads 103 on the upper corners of the inner surface of the upper section 26 of the rear magazine face and spacing pads 104 on the corners of the inner surface of the lower section 26' of the rear magazine face. These pads 103 and 104 are adapted to space the upper and lower outer edges of a slide away from the rear face of the magazine and are formed with tapered edges 103' and 104', respectively, to facilitate the movement of a slide over these pads and prevent possible jamming of an edge of a slide on the edges thereof. The rear edge of the inner side 24 of the magazine, which forms one side of the slide withdrawal slot, is formed with a slightly raised ledge 105 along the central portion thereof opposite to and facing the spacing pads 103 and 104, so as to provide a transverse slot width at the ledge of not more than one and one-half times the average thickness of a picture slide. This ledge 105 preferably is formed slightly curved or tapered, so that its greatest width is at substantially the center of the withdrawal slot and its outer ends merge into the top and bottom edges 105' and 105" of the magazine side 24. This combination of spacing pads and ledge permits a slightly bowed slide to pass therebetween out of the withdrawal slot and limits the withdrawal of slides from the magazine to a single slide at a time.

The finger grip 69 is adapted to be pulled out fully to the end of its travel away from the viewing compartment to bring a picture slide 100 in viewing position in the viewing compartment. In so pulling out the finger grip 69, the impelling finger 71 passes out of the slide magazine from the position shown in Figs. 20 and 21 and through the slide withdrawal slot into the position shown in Figs. 4, 22, 23, and 24, pushing a slide 100 completely out of the magazine into viewing position on a slide holder 106. This slide holder comprises a mounting base 107 having an inner upwardly extending flange 108, which is formed with a transversely extending slide supporting section 109. The mounting base 107, the flange 108, and the slide supporting section 109 can conveniently be formed by bending or pressing a single sheet of metal to provide these parts and then bending or pressing the outer edge of the flange 108 to provide an outer slide retaining guide wall 110. The inner end of the transverse section 109 preferably is cut and bent as a tongue 111, substantially wider at its outer edge than the width of the slide supporting transverse section 109 and flared inwardly to the width of this section. The tongue 111 preferably is also curved downwardly, so that it provides a relatively wide surface slightly lower than the supporting surface of the section 109 for guiding the lower forward edge of a slide 100 into position on the slide supporting section 109. An outer slide retaining guide wall 112 is secured to the outer side of the flange 108 and provides a guideway 113 therebetween having a width of substantially the thickness of a single picture slide. This width is made equal to that of the thickest commercial picture slide so as to accommodate slides of varying thicknesses. In order to assist in securely holding slides of different thicknesses in the channel 113, the inner end 114 of the outer slide retaining guide wall 112 is bowed inwardly into close proximity to the inner end of the inner slide retaining guide wall 110 and provides a spring clip or adjustably clamping slide holder, which is spread apart as a slide enters the channel 113. The bowed inner end 114 of the outer slide retaining guide wall 112 is flared outwardly at 115 and the inner end 116 of the inner slide retaining guide wall 110 is flared inwardly so as to provide a relatively wide mouth which facilitates the admission and guidance of a slide into the channel 113.

The proper positioning of a slide on the slide holder 106 in its viewing position is further assured by the provision of upwardly extending supporting guide 117 formed with upper and lower retaining fingers 118 and 119, respectively. The ends 118' and 119' of the retaining fingers 118 and 119, respectively, are flared outwardly to assist in guiding the leading edge of a slide into position between the fingers 118 and 119. The upwardly extending guide 117 also includes an outer positioning wall or stop 120, which extends transversely and vertically between the fingers 118 and 119 so as to engage the leading edge of a picture slide and definitely limit the position to which it can be pushed on the slide holder 106 and to assure the location of the picture slide in the most desirable viewing position.

During the transfer of a slide from the slide magazine into viewing position upon the slide holder 106, it is essential that the slide holder be locked in viewing position, as shown in Figs. 17 through 24. A mechanism is provided for thus locking the slide holder 106 during the movement of the control bar 68 and the impelling finger 71 from the positions shown in Figs. 32, 17, 18, and 19 to the positions shown in Figs. 15, 22, 23, and 24. This locking mechanism includes a cam and Scotch yoke operatively connected to the control bar 68 through a longitudinally extending cam guide slot 121, along the inner transverse edge of the control bar 68, adjacent to the inner end thereof. This cam guide slot 121 is formed with retaining stops 122 and 123 at each end thereof and with a rocker seat 124 substantially centrally thereof to provide for operatively retaining a rocker cam 125 in the cam slot 121. The rocker cam 125 extends longitudinally of the control bar 68 and is formed with a pair of notches at each end thereof, the outer of which forms a stop 126 on each end of the cam complementary to the control bar stops 122 and 123 for retaining the rocker cam 125 transversely in the cam guide slot 121. A leaf spring 127 is arranged between the adjacent surfaces of the rocker cam 125 and the cam guide slot 121 and is formed with a pair of longitudinally extending arms connected together by an intermediate portion which extends into the rocker seat 124 and is engageable by a rocker pivot 128 on the cam 125, so that the ends of the arms of the spring 127 resiliently bias the cam outwardly transversely of the guide slot 121.

The cam surfaces of the rocker cam 125 are formed so as to provide for locking the slide holder 106 in either of two positions while a slide is being moved relative to the slide holder and for rapid movement of the slide holder between these two positions by relatively slight movements of the control bar 68, during which latter movements the slides in the slide magazine or a slide on the slide holder remain in these respective positions. These cam surfaces of the rocker cam include notches 129 and 130 in the ends of the outer transverse edge of the rocker cam. These notches provide for the relatively rapid movement of the slide holder 106 for relatively slight movements of the control bar 68, as will be explained later. A slightly curved cam surface 131 extends from the notch 129 towards the notch 130 and is interrupted a short distance from the notch 130 by a step 132, the outer edge of which is connected to the outer edge of the notch 130 by a slightly curved cam surface 133.

A Scotch yoke 134 is provided for transmitting the desired cam action from the rocker cam 125 to the slide holder 106 and operatively connects these two members of the slide transfer mechanism. This Scotch yoke 134 includes an offset crank follower formed with a follower arm 135, pivotally mounted on the main supporting base 5 by a pivot pin 136, and formed with an outwardly extending follower finger 137 adapted to engage the outer transverse cam surface formed by the notches 129 and 130, the curved cam surfaces 131 and 133, and the step 132. This follower finger 137 is adapted to cooperate with the cam surfaces to provide the desired operating movements to the slide holder and also to lock the slide holder in the above-mentioned two positions while a slide is being moved into viewing position on the slide holder and while a slide is being pushed off the slide holder into the slide magazine. As shown in Figs. 17 and 19, the follower finger 137 is formed with an operating surface 138, which is aligned with the edge of the curved cam surface 133 adjacent to the notch 130, and is adapted to bear against this cam surface while the control bar 68 is pulled outwardly for impelling a slide out of the slide magazine by the impelling finger 71.

After a predetermined initial travel of the impelling finger through the slide magazine, it is desirable that reverse movement of the impelling finger 71 be prevented in order to avoid damaging picture slides within the slide magazine. In order to prevent such possible damage to slides, outward movement of the control bar 68 causes the follower finger 137 to pass over the step 132 in the rocker cam surface, and the operating surface 138 of the finger 137 engages the curved cam surface 131. As the finger 137 passes over the step 132, the leaf spring 127 biases the rocker cam 125 transversely and prevents reverse movement of the control bar 68, as the step 132 forms a stop engageable by the finger 137 to prevent such movement. The Scotch yoke follower crank 135 is continuously locked in the positions shown in Figs. 17 and 19 and prevents rotation of the Scotch yoke as long as the follower finger 137 points towards the hand grip 39, as the cam slot 121 is not wide enough to allow the finger to turn during its travel over cam surfaces 131 and 133. The offset crank follower arm 135 is formed integral with a crank arm 139 which extends substantially at right angles to the arm 135 and is mechanically connected thereto by a section 140 which provides for spacing the crank arm 139 out of the plane of the crank arm 135. This assures that the arm 139 is free to pass under the control bar 68 without interference therewith during part of the operating cycle of the slide transfer mechanism. The end of the crank arm 139 is operatively connected to the slide holder 106 by a pin 141, which extends through a guide slot 142 in the supporting base 5 and operatively engages the slide holder mounting base 107 through a longitudinally extending slot 143 formed therein. As is more clearly shown in Figs. 15, 16, 17, and 18, the slide holder mounting base 107 is slidably mounted upon a pair of rods 144, which are rigidly secured in two upwardly extending flanges 145 and 146 conveniently formed integral with the main supporting base 5. In order to prevent binding of the slide holder on the rods 144, these rods extend through the upwardly extending slide holder base flange 108 and through a pair of aligned openings formed in a pair of upwardly extending mounting flanges 147 and 148, formed integrally with the slide holder mounting base 107 along the rear edge thereof.

In this manner, locking of the offset crank arm 135, by the engagement of the follower finger surface 138 with the rocker cam surfaces 133 and 131, locks the Scotch yoke 134, which includes the crank arms 135 and 139, the operating pin 141 and its connection with the slide holder mounting base 107, thus effectively locking the slide holder 106 during movement of the control bar 68 for all positions thereof while the follower finger 138 is in engagement with the cam surfaces 131 and 133. This assures that the slide holder 106 remains in a position to receive a slide thereon at all times while the impelling finger 71 pushes a slide out of the slide magazine into viewing position on the slide holder.

*Illuminating compartment and system*

When a slide has been completely inserted into the slide guiding channel 113, with its leading edge between the retaining fingers 118 and 119, and the control bar 68 has been pulled out fully into slide viewing position, as shown in Figs. 4, 22, 23 and 24, it is desirable that the picture slides should be illuminated during such time as an observer may desire to look at the picture on the slide holder. In order to provide this illumination of a picture slide when in viewing position, the control bar 68 is adapted to control the source of light through a novel and improved switch mechanism. This switch mechanism includes the notch 130 in the rocker cam 125, which is adapted to engage an upwardly extending finger 149 on the end of an arm 150 of a bell crank pivotally mounted at its elbow 151 by a pivot pin 152 on the underside of the main supporting base 5. Engagement of the bell crank finger 149 by the edge of the rocker cam notch 130, as the control bar 68 is pulled outwardly, causes the bell crank arm 150, as viewed in Fig. 24, to swing in a clockwise direction about the pivot pin 152, and thus also move another arm 153 of this bell crank in a clockwise direction. The bell crank arm 153 is formed with an upwardly extending finger 154, which is adapted operatively to engage an upwardly extending finger 155 formed on the end of a lever 156. This lever 156 is pivotally mounted on the underside of the main supporting base 5 by a pivot pin 157 and is provided with an upwardly extending finger 158 adapted to engage the outer end of a push button switch operating pin 159 for biasing this pin and operating an electric switch which controls an electrical energizing circuit for a suitable electric light bulb 160.

The electrical switch for controlling the electric bulb energizing circuit is mounted upon the front 20 of the illuminating compartment 4, which may conveniently be formed as a separate face plate having a front panel 161. This front panel 161 is formed with an inwardly extending mounting flange 162, which extends around the sides and top and projects inwardly a short distance at the bottom. The outer surface of the mounting flange 162 is substantially complementary to the inner surface of the front end of the top and sides of the illuminating compartment casing 15, so as to provide a snug fit therewith, as shown in Fig. 2.

In order to secure the face plate in position on the illuminating compartment casing 15, an outwardly extending latching boss 163 is formed medially on the upper edge of the front panel 161 of a depth slightly less than the thickness of the front panel 161. This boss 163 is formed flush with the inner surface of the front panel 161, so that its outer face is depressed slightly from the outer surface of the face plate. A complementary groove 164 is formed in the underside of the outer edge of the top of the illuminating compartment casing 15 and is spaced inwardly from the outer face thereof a distance such that, when the boss 163 is in position in the groove 164, the outer face of the front panel 161 is substantially flush with the outer surface of the casing flange 16. The front panel 161 is adapted to be rigidly secured to the illuminating comparting casing 15 by securely drawing up a screw 165, which is inserted through the front panel and a mounting boss 166 and threadedly engages a tapped opening in an upwardly extending brace 167 rigidly secured to the bottom of the casing 15 by a screw 168, which extends through the bottom of the casing and threadedly engages a tapped opening in the brace 167.

The front panel 161 of the illuminating compartment preferably is formed of insulating material which might comprise any suitable plastic and provides an insulating mounting base for an electric circuit breaker adapted to control the circuit of the illuminating system for the slide viewer. In accordance with this invention, an improved electric circuit breaker is mounted on the insulating front panel 161 and comprises a stationary contact member, formed of any suitable material, such as beryllium-copper. This stationary contact member includes a substantially U-shaped portion having an outer transversely extending relatively long contact leg 169 spaced from a relatively shorter leg 170 which preferably is formed integral with an upwardly extending battery terminal element 171. The member comprising the stationary contact 169 and the battery terminal element 171 are secured in any suitable manner to the insulating front panel 161, as by a rivet 172, which may suitably extend through the bottom of the battery terminal element 171 and the front panel 161, so as to space the stationary contact leg 169 from the front panel 161. The electric circuit breaker or switch further includes a leaf spring contact member 173, which extends transversely across the lower inner side of the front panel 161, with its outer end extending between the stationary contact member leg 169 and the lower end of the battery terminal element 171, as is more clearly shown in Fig. 3. The switch push button operating pin 159 extends through an insulating boss 174 on the outer side of the front panel 161, through an aperture in the panel 161, and a coaxial aperture 175 in the battery terminal element 171, and terminates in an operating head 176. The push button operating pin 159 and its head 176 are made of any suitable insulating material, such as molded plastic, and the operating head 176 is arranged between the inner surface of the battery element 171 and the adjacent outer surface of the spring contact member 173, so as to space the contact member 173 and insulate the same from the battery terminal element 171. The end of the leaf spring contact member 173 away from the push button operating head 176 is mechanically and electrically connected to a second battery terminal element 177 in any suitable manner, as being made integral therewith and connected thereto by an angularly bent portion 178. The second battery terminal element 177 and the leaf spring contact member 173 are securely mounted in any suitable manner upon the insulating base formed by the front panel 161. This mounting may conveniently comprise a rivet 179, which extends through the battery terminal element 177 and the front panel 161. As is more clearly shown in Fig. 3, the spring contact member 173 normally is biased away from the stationary contact leg 169 and against the push button operating head 176. Pressure on the push button operating pin 159 will be transmitted to the operating head 176, so as to bias the spring contact member 173 into mechanical and electrical contact with the stationary contact member leg 169, thereby closing the electric circuit therebetween when the operating pin 159 is thus depressed.

The electrical circuit for the illuminating system includes a suitable source of electrical power supply, such as a pair of electric dry cell batteries 180, one of which contacts the battery terminal element 171 with one of its terminals 181 and makes contact with its other terminal 182 with a terminal element 183 mounted on the back of the illuminating compartment casing 15. The terminal element 183 is electrically connected by any suitable electrical conductor 184 to one side of an incandescent lamp socket 185 in which a suitable electric bulb 160 is mounted. This lamp socket 185 is rigidly mounted on a bracket 186, which is secured by a screw 187 to a mounting boss 188 formed on the upper side of the illuminating compartment casing 15. The electric circuit for the lamp bulb 160 is completed by connecting the other terminal of the lamp socket 185 by a suitable electrical conductor 189, electrically connected to a terminal element 190 mounted on the back of the illuminating compartment casing 115. This terminal element 190 is adapted to have a good electrical contact with a terminal of the second electric dry cell battery 180 so as to connect this second dry cell in series circuit relation with the first dry cell and the electric bulb. The other terminal 191 of the second electric dry cell battery 180 is arranged in good mechanical and electrical contact with the battery terminal element 177, and through it is electrically connected to the switch spring contact member 173.

The illumination of a picture slide when in slide-viewing position, as shown in Figs. 4, 22, 23 and 24, is thus automatically provided when the control bar 68 is drawn out fully from the viewing compartment 2. In this position, the notch 130 of the rocker cam 125 turns the bell crank arm 150, as is more clearly shown in Fig. 24, and the bell crank arm 153 biases the lever 156 through the fingers 154 and 155, so that the lever finger 158 depresses the circuit breaker operating pin 159 and closes the electrical circuit through the leaf spring contact member 173 and the stationary contact 169, so as to electrically energize the lamp bulb 160.

In order to prevent glare or a localized bright spot on the picture slide, a light diffusing screen 192 of any suitable material, such as translucent plastic, is mounted over an illuminating opening formed in the front panel 161 directly in front of the electric bulb 160. In order further to assure a substantially uniform light intensity over the area of the picture slide and to provide for a maximum utilization of the light emitted by the electric bulb 160, a suitable light reflector 193 made of any suitable material, such as a glazed white plastic, is mounted upon the rear surface of the front panel 161 and is arranged wtih its front edges substantially co-extensive with the edges of the light diffusing screen 192. A suitable aperture 194 is formed in the apex of the reflector 193 of such size that the electric bulb 160 can conveniently be passed through this aperture, as is more clearly shown in Fig. 2.

In order further to assure a maximum uniformity of illumination to a picture slide when in viewing position, a second light diffusing screen 195, more clearly shown in Figs. 4 and 5, is mounted in guideways 196 and 197 formed in the upper and lower sections of the rear side of the viewing compartment 2. As shown in these figures, this second light diffusing screen 195 is somewhat larger than an average picture 198 on a picture slide 100 and thus assures a substantially uniform light intensity over the entire surface of a picture 198 and thus assures a more even illumination of the entire picture. Release of the finger grip 69, when the control bar 68 is in slide-viewing position releases the pressure on the switch operating pin 159, and the spring pressure of the leaf spring contact member 173 upon the switch operating pin head 176 biases the spring contact member 173 away from the stationary contact 169 and opens the electrical circuit therebetween. This is made possible by a slight amount of play which exists in the mechanical connections of the control bar 68 to the remainder of the slide transfer mechanism, such that the pressure of the spring contact member 173 moves the control bar 68 a very short distance but sufficiently to open the electrical circuit of the light bulb 160. This automatically provides for the more efficient utilization of the electric dry cell batteries 180, as they are discharged only during such periods as an observer is actually viewing a slide.

*Slide viewing structure*

When a slide 100 is in viewing position, as shown in Figs. 4 and 5, an observer is provided with a magnified image of the picture on the slide by looking into the viewing compartment 2 through the lens compartment 3. This lens compartment may include any number of suitable enlarging lens, and, in the illustrated construction, two lenses are provided. An inner magnifying lens 199 is mounted in grooves 199" in casing 12 by bosses 199' formed on the edges of lens 199, and an outer magnifying lens 203 is mounted in grooves 203" by bosses 203'. This structure provides for a substantial magnification of the picture on the slide 100 and, in conjunction with the evenly distributed diffused light provided by the two diffusing screens 192 and 195, enables an observer to see the picture at its maximum beauty. Where a projected image is desired, the lens system may comprise a suitable projector-type lens system.

*Transfer mechanism for guiding slide into magazine*

In accordance with this invention, after a slide has been viewed by an observer, the slide transfer mechanism is adapted to return such slide into the storage magazine and to restore the transfer mechanism to the initial position for placing another slide in viewing position. In order to provide for sequentially viewing a series of slides in a storage magazine and to maintain these slides in the same sequence, it is necessary that a slide which has been viewed be re-inserted into the opposite side of the magazine to that from which it was taken. It thus becomes necessary to transfer a slide, which has been viewed, from its viewing position adjacent to the rear of the viewing compartment, as shown in Figs. 15 and 22, transversely of the viewing compartment, to a slide return position in alignment with the front side of the magazine. In order to provide for this transverse movement of a slide, the slide holder or mounting carriage 106 is transversely slidable on the rods 144 and is adapted to be moved as indicated by the dotted arrow 205, Figs. 15 and 17. This transverse movement of the slide holder is accomplished by a relatively slight longitudinal return movement of the control bar 68 obtained by pushing the hand grip 69 toward the viewing compartment. Such return movement of the control bar 68 is indicated by arrows 206, Figs. 17, 25, and 26, and results in the engagement of an operating surface 207, on the follower finger 137, by the transverse cam surface of the notch 129 on the cam 125. This action moves the follower finger 137 from the position shown in Fig. 24 to the position shown in Fig. 26, and eventually to the position shown in Fig. 28, that is, the follower finger 137 is turned in a counter-clockwise direction as seen in these figures. This movement of the follower finger 137 produces a counter-clockwise rotation, as viewed in these figures, of the offset crank arms 135 and 139, which carries the Scotch yoke operating pin 141 in a corresponding direction, as indicated by the arrow 208 in Fig. 17. The Scotch yoke operating pin 141 is guided in this travel from the position shown in Fig. 17 to a position adjacent to the front of the main supporting base 5 by the sides of the arcuate slot 142 in the main supporting base 5. The end of the Scotch yoke operating pin 141, which forms an operative connection with the slide holder mounting base 107 through a lost-motion connection therewith, transmits the operating force from the control bar 68 to the slide holder 106 by exerting a lateral component of force upon the sides of the slot 143 in the slide holder mounting base 107.

The movement of the control bar required for completely shifting the slide holder 106 from the slide viewing position to the slide return position is that required to turn the follower finger 137 through approximately 90° of arc, from the position shown in Fig. 24 to that shown in Fig. 28. This is accomplished by a relatively short travel of the control bar 68, as the movement of the follower finger 137 is greatly magnified by the offset crank to which the follower finger is secured. The ratio of movement of the follower finger to the movement of the Scotch yoke operating pin 141 on the crank arm 139 is the ratio of the relatively small radius from the operating surface 207 of the follower finger 137 to the center of the pivot pin 136 to the radius corresponding to the distance from the center of the Scotch yoke operating pin 141 to the center of the pivot pin 136. As in any Scotch yoke connection, the rotary movement of the finger 137 and of the operating pin 141 is transferred into a translatory movement in the slide holder through the lost-motion connection formed between the end of the operating pin 141 and the sides of the slot 143 in the mounting base 107 of the slide holder 106. This transverse movement of the slide holder 106 is indicated in Fig. 25 by arrow 205'. When the slide holder has been completely moved to its slide return position, as shown in Fig. 27, a slide 100 on the slide holder is then in position for re-insertion into the slide magazine.

Further return movement of the control bar 68 towards the viewing compartment, from the position shown in Figs. 27 and 28, pushes the longitudinally extending curved cam surface 131 under the follower finger operating surface 207, so as to lock the Scotch yoke in the position shown in Fig. 28, and latch the slide holder in the slide return position shown in Fig. 27.

As the control bar 68 is pushed further inwardly, a second impelling finger 209, fixedly secured to the control bar 68 in any suitable manner, as by a pair of rivets 210, and extending through a slot 211 in the main supporting base 5, is adapted to engage an edge of a slide 100 on the slide holder and to push such a slide back into the slide storage magazine. This slide impelling finger 209 is formed with a tip 212 which extends transversely of the main supporting base 5 to substantially the front edge of the upwardly extending guide member 117, and the upper edge of the impelling finger tip 212 extends to within a short distance of the lower edge of the slide retaining finger 119 on the slide holder 106. In this manner, the impelling finger tip 212 extends across the outer edge of a slide 100, and movement of the impelling finger 209 and the control bar 68 towards the storage compartment 1, as indicated by arrows 206', Figs. 27 and 28, pushes the slide 100 into a return slot in the slide storage magazine, as shown in Fig. 29.

The return impelling force of finger 209 upon a slide 100 will cause it to pass first from the slide holder 106 in the direction indicated by the arrow 27', Fig. 7, and will enter the slide magazine through the return slot 29' between the front edge 213 of the side 24 of the magazine and the side edge 214 of the closure face 29 of the magazine. The edge 213 of the side 24 is formed with an inwardly tapered surface 213' and the edge 214 of the closure face 29 is formed with an inwardly tapered surface 214'. These tapered surfaces 213' and 214' serve to guide the leading edge of a picture slide into the return slot 29' of the storage magazine and facilitate the re-insertion of such a slide into the magazine.

Further actuation of the impelling finger 209 by continued movement of the control bar 68 towards the slide storage compartment, as indicated by 206", Figs. 29 and 30, will cause the leading edge 100' of a slide 100 to engage the bowed leaf springs 43, which bias the edge 100' against the other slides which are stored in the magazine. The slide 100 also tends to flatten out the bowed springs 43 and, in so doing, cause the ends 44 of the springs to move outwardly in the recesses 48 of the closure face 29. The lower ends 213" and 214" of the edges 213 and 214, respectively, are depressed slightly and the adjacent corner of the bottom 23 of the slide storage magazine is indented at 23', such that the impelling finger 209 and its tip 212 can be moved past the inside surface of the magazine side 24 when the control bar 68 is moved to its limiting position towards the storage compartment 1. This position of the control bar 68 and the impelling finger 209 is shown in Fig. 16. In this manner the picture slide 100 completes its travel circuit back into the magazine and the slides are again stacked in the same manner and under the same spring pressure as before the slide 100 was moved out of the magazine into viewing position on the slide holder 106.

During the foregoing action of the slide transfer mechanism in returning a slide 100 into the storage magazine, the first mentioned impelling finger 71 is returned from its position adjacent to the viewing compartment to its starting position for initiating the transfer of another slide from the storage magazine to the slide holder. The return travel of the impelling finger 71 occurs entirely outside of the slide magazine so as to prevent any possible damage to slides in the magazine. This requires that the impelling finger 71 move transversely outwardly from the slide magazine.

This action transverse movement of the impelling finger 71 is obtained by pressing the follower finger 91 against the angularly extending end cam surface 88 of the spring cam 78, as pressure is transmitted thereto through the crank 72 and pivot pin 73 from the control bar 68. Pressure of the follower finger 91 upon the outer cam surface 88 of the spring cam 78 causes the follower finger 91 to slide transversely outwardly over the cam surface 88. This outward sliding movement of the follower finger 91 causes the crank 72 to swing through a small arc in a counter-clockwise direction as seen in Fig. 28, and thus moves the follower finger 71 towards the rear side of the storage compartment 1. In so doing, the lower end 76 of the impelling finger 71 is moved outwardly towards the rear edge of slot 75. Further movement of the control bar 68 to the end of its travel towards the storage compartment 1 moves the impelling finger 71 toward the outer end of slot 75 and the follower finger 91 presses the spring cam section 79 against the flange 83, as shown in Fig. 30. Just prior to the end of this return travel, the follower finger 91 is in the position shown in Fig. 31 at the end of the spring cam section 79. As the control bar 68 is pushed to the end of its return travel, the follower finger 91 moves beyond the end of the spring cam 78, and the latter springs back to the position shown in Fig. 32, with the spring section 79 away from the flange 83, free from the follower finger 91.

In order to place the impelling finger 71 in its starting position for pushing a picture slide out of the storage magazine, the control bar 68 is pulled a slight amount in a direction away from the viewing compartment, as indicated by the arrow 99 in Fig. 32. The initial movement of the control bar 68 in this direction has no effect upon the impelling finger 71, as the pivot pin 73 is in the end of the slot 74 in the control bar 68 nearest to the finger grip 69, and when the control bar is pulled outwardly, the slot 74 merely slides along the pivot pin 73 and no force is transmitted to this pivot pin, and, therefore, no action is transmitted through it to the impelling finger 71.

During this outward movement of the control bar 68, the rocker cam notch 130 engages the follower finger 137 and moves this finger in a clockwise direction as seen in Fig. 32, to the position shown in Fig. 17. This movement of the follower finger 137 causes the offset crank arms 135 and 139 to turn from a position in which the pin 141, on the end of the crank arm 139, is adjacent to the end of the slot 142 indicated by the head of the arrow 208, Fig. 17, in a direction opposite to that indicated by this arrow 208, to the position shown in Fig. 17 adjacent to the rear edge of the viewing compartment. Such movement of the pin 141, in a direction opposite that of the arrow 208, causes the pin 141 to transmit a component of force to the slide holder mounting base 107 which moves the slide holder 106 from the position shown in Figs. 29 and 16 to the position shown in Figs. 17 and 18, that is, the slide holder 106 slides transversely of the viewing compartment on the rods 144 from the slide return position to the slide viewing position.

A very slight additional outward movement of the control bar 68 exerts pressure on the pivot pin 73 in a direction towards the viewing compartment, which pressure is transmitted through the crank 72 to the follower finger 91 and causes the follower finger 91 to engage the inwardly extending end cam surface 86, as shown in Fig. 32, so that it slides rapidly over this surface towards the cam surface 87 and carries with it the impelling finger 71 from a position adjacent the rear edge of the slot 75 to the slot 29' at the outer rear corner of the slide magazine and into alignment with the rearmost picture slide in the magazine, thus placing the impelling finger 71 in its starting position for initiating a new cycle of operation, as shown in Figs. 8, 17, and 18.

*Individual slide viewing structure*

Under certain circumstances, an observer may wish to view only a single slide, without the need of inserting such a slide into a slide magazine for viewing the same. In accordance with this invention, such a single slide 217 may be viewed by inserting it through a slot 215 in the top 216 of the viewing compartment 2 and placing the bottom of such a slide 217 on a mounting rack 218. An outwardly flared lip 219 is formed along the longitudinal edge of rack 218 for guiding the lower edge of the slide 217 into proper viewing position on the mounting rack 218.

When it is desired to thus view an individual slide, the slide storage magazine is removed from the storage compartment and the control bar 68 is pulled to its outermost position corresponding to the viewing position, so that the rocker cam notch 130 engages the bell crank finger 149 and acts through the bell crank arm 150 and the lever 156 to push the switch operating pin 159 to its closed circuit position for energizing the electric light bulb 160. This provides for the proper illumination of the individual slide, so that it may be viewed through the lens compartment 3 in the same manner as a slide which is in viewing position on the slide holder 106. In order to facilitate the removal of a slide 217 from the viewing compartment mounting rack 218, a pair of finger grip notches 220 and 221 are formed medially of the longitudinal edges of the slot 215, so that the slide can easily be grasped and pulled out of the viewing compartment.

*Operation of slide viewer*

The operation of a slide viewer constructed in accordance with this invention is controlled by a relatively simple manual in-and-out sliding movement of the control bar 68 in response to the pushing and pulling of the finger grip 69. An observer may sequentially view a series of slides by pulling out on the finger grip 69, which initially assures the positioning of the slide holder 106 in slide viewing position, as shown in Fig. 17, and moves the slide impelling finger 71 into position for pushing a slide out of the slide storage magazine into viewing position on the slide holder 106.

The initial movement outwardly of the control bar 68, when the finger grip 69 is pulled, causes the follower finger 91 to engage the inwardly angularly extending spring cam end surface 86, as shown in Fig. 32, so as to cause the follower finger 91 to slide along this surface transversely of the storage compartment and towards the front of the slide viewer, as shown in Fig. 17. This action places the impelling finger 71 in the slot 92 formed in the rear outer corner of the slide magazine, as shown in Fig. 8.

Further outward pulling on the finger grip 69, as indicated by the arrows 99, Figs. 17, 18, and 19, results in the pushing of a slide 100 out of the slide magazine into position on the slide holder 106, as indicated in Fig. 20, and finally into the position shown in Figs. 15 and 22. The slide 100 is now in slide viewing position, and, when the finger grip 69 is pulled to its extreme outer position, the push button switch operating mechanism is biased by the notch 130, so as to depress the switch operating pin 159, as shown in Fig. 24, which closes the electrical energizing circuit for the light bulb 160 and illuminates the slide. This enables an observer to view the slide 100 through the lenses 199 and 203 of the lens compartment 3.

If for any reason it is desired to place the slide holder aside without returning the slide 100 into the slide storage magazine, a mere release of the finger grip 69 results in the extinguishing of the electric light bulb 160. This is due to the fact that the leaf spring contact arm 173 inherently tends to move to open circuit position away from the stationary contact 169, and the spring pressure of the contact 173 is sufficient to bias the switch operating pin 159 outwardly to a limited degree sufficient to open the circuit between the contacts 169 and 173. This provides for the efficient utilization of the electric batteries, which energize the light bulb, in that they discharge only during such periods as an observer actually holds control bar 68 in a slide viewing position.

After a slide has been viewed, the slide transfer mechanism is adapted to return the slide to the storage magazine. This is accomplished by pushing inwardly on the finger grip 69, so as to move the control bar 68 inwardly in a direction towards the storage compartment 1. This inward movement of the control bar 68, indicated by arrows 206, Figs. 25 and 26, first shifts the slide holder 106 transversely of the viewing compartment from the slide viewing position to the slide return position as shown in these figures. Further inward movement of the control bar 68, as indicated by arrows 206', Figs. 27 and 28, causes the return impelling finger tip 212 to engage the edge of a slide 100 on the slide holder 106 and to push such slide from the initial slide return position, Fig. 27, into the slide storage magazine, as shown in Fig. 29.

During this re-insertion of a slide into the slide magazine, the slide impelling finger 71 is returned to its starting position outside of the magazine. It is guided in this return movement by the spring cam 78 cooperating with the follower finger 91, which is initially biased toward the rear edge of the slot 75 by engagement with the angularly extending spring cam surface 88, and then travels along the rear edge of the flange 84, along the rear surface of the spring cam section 79, as shown in Figs. 30 and 31, until it passes the end of this part of the spring cam, at which point the spring cam automatically springs outwardly to the position shown in Fig. 32, leaving the follower finger 91 in the position shown in this figure.

After a slide has been re-inserted into the slide magazine and the slide impelling finger 71 has been returned to its initial position shown in Fig. 32, the cycle of operation can be repeated by simply pulling outwardly on the finger grip 69, which initially moves the slide holder 106 transversely of the viewing compartment from the return position shown in Figs. 29 and 16, to the slide viewing position shown in Fig. 17 through the operation of the Scotch yoke which is actuated by engagement of the follower finger 137 by the rocker cam notch 130. The operation of the Scotch yoke is indicated by the positions of the crank arms 135 and 139 in Figs. 32 and 17.

A slight additional pull on the finger grip 69 causes the follower finger 91 to engage the outer transversely extending spring cam surface 86 so that it slides along this surface from the position shown in Fig. 32 to that shown in Fig. 17, and then moves in a direction toward the front of the slide holder. This motion of the follower finger 91 carries the slide impelling finger 71 into its initial slide impelling position. Further outward pull on the finger grip 69 results in a repetition of the cycle of operation as heretofore described.

While the embodiment of the viewer described herein provides for the observation of the slides in the viewing position or compartment directly through the lens 199 and 203, it is clear that an image of the slide, which is positioned in the viewing position, may be projected onto a suitable screen by replacing the lens 199 and 203 with suitable projector lenses and by suitably intensifying the illumination of the slide. The slide changing and handling mechanism disclosed herein is, thus, useful with other forms of viewers than the preferred embodiment illustrated and described herein and the term "slide viewer" as used herein is not limited to direct viewing types of slide viewers.

It will be seen that the present invention provides a new and improved mechanism or device for viewing picture slides and provides for the most efficient utilization of the various components comprising the operating mechanism of the device.

Various changes may be made in the form, construction, and arrangement of the parts herein described and illustrated without departing from the spirit and scope of the invention and without sacrificing any of its advantages. It is to be understood, therefore, that the details herein shown and described are to be interpreted as illustrative of this invention and not in a limiting sense, and it is intended to cover all such modifications as are encompassed by the claims appended to and forming a part of this specification.

Having thus described my invention, what I claim is:

1. A picture viewer comprising a magazine adapted to contain a plurality of picture slides in stacked order, means in said magazine for biasing picture slides from one face of said magazine towards the opposite face thereof, a viewing compartment adjacent to said magazine, a slide withdrawal slot along an edge adjacent to said opposite magazine face in one side of said magazine adjacent to said viewing compartment for passage of a picture slide from said magazine into said viewing compartment, a slide return slot in said one side of said magazine along the edge thereof opposite said withdrawal slot, a slide mounting carriage in said viewing compartment, means for transferring single slides from said magazine through said withdrawal slot into viewing position on said mounting carriage, means for moving said mounting carriage transversely of said viewing compartment from slide viewing position to adjacent to said slide return slot in said magazine, and means for transferring a slide from said mounting carriage through said return slot into stacked position in said magazine.

2. A picture viewer comprising a magazine adapted to contain a plurality of picture slides in stacked order, means in said magazine for biasing picture slides from one face of said magazine towards the opposite face thereof, a viewing compartment adjacent to said magazine, a slide withdrawal slot along an edge of one side of said magazine adjacent to said opposite face thereof for passage of a picture slide from said magazine into said viewing compartment, a slide return slot in said one side of said magazine along the edge thereof opposite said withdrawal slot, a slide mounting carriage in said viewing compartment, said slide mounting carriage having means for adjustably clamping a slide thereon for accommodating slides of different thicknesses, means for transferring single slides from said magazine through said withdrawal slot into viewing position on said mounting carriage, means for moving said mounting carriage transversely of said viewing compartment from slide viewing position to adjacent to said slide return slot in said magazine, and means for transferring a slide from said mounting carriage through said return slot into stacked position in said magazine.

3. A picture viewer comprising a magazine adapted to contain a plurality of picture slides in stacked order, means in said magazine for biasing picture slides from one face of said magazine towards the opposite face thereof, a viewing compartment adjacent to said magazine, a slide withdrawal slot along an edge of one side of said magazine adjacent to said opposite face thereof and said viewing compartment for passage of a picture slide from said magazine into said viewing compartment, means including pads on the corners of said opposite face of said magazine for spacing the corners of a picture slide away from said opposite magazine face, means including a slightly raised ledge along the central portion of the edge of said withdrawal slot opposite to and facing said pads providing a transverse slot width at said ledge of not more than one and one-half times the thickness of a picture slide for limiting the withdrawal of slides from said magazine sequentially to a single slide while allowing passage through said slot of slightly bowed slides, a slide return slot in said one side of said magazine along the edge thereof opposite said withdrawal slot, a slide mounting carriage in said viewing compartment, means for transferring single slides from said magazine through said withdrawal slot into viewing position on said mounting carriage and sequentially moving said mounting carriage transversely of said viewing compartment from slide viewing position to adjacent said slide return slot, transferring a slide from said mounting carriage through said return slot into stacked position in said magazine, and returning said mounting carriage to initial slide viewing position.

4. A picture viewer comprising a magazine adapted to contain a plurality of stacked picture slides, means including a pair of bowed leaf springs mounted for longitudinal extension and resultant variation in bowed depth thereof adjacent to the upper and lower edges of one inner face of said magazine for biasing picture slides from said one face of said magazine towards the opposite face thereof, said one face of said magazine having a pair of apertures adjacent to the upper edge and a second pair of apertures adjacent to the lower edge thereof with a guide slot extending between each pair of apertures, a pair of recesses on the opposite side of said one face from each of said pairs of apertures and communicating therewith, a stop formed on the bottom of each of said recesses, each of said bowed springs being formed with notches extending longitudinally thereof in an edge of said springs adjacent to each end thereof, each of said springs being mounted on said one face of said magazine with each of said notches arranged around a separate one of said stops in said recesses, said notches being relatively longer than the width of each of said stops whereby said ends of said bowed springs are longitudinally movable to provide for compression of said springs, a viewing compartment adjacent to said magazine, a slide withdrawal slot along an edge adjacent to said opposite face of said magazine in one side of said magazine adjacent to said viewing compartment for passage of a picture slide from said magazine into said viewing compartment, a slide return slot in said one side of said magazine along the edge thereof opposite said withdrawal slot, a slide mounting carriage in said viewing compartment, means for transferring single slides from said magazine through said withdrawal slot into viewing position on said mounting carriage, means for moving said mounting carriage transversely of said viewing compartment from slide viewing position to adjacent to said slide return slot in said magazine, and means for transferring a slide from said mounting carriage through said return slot into stacked position in said magazine.

5. A picture viewer comprising a magazine adapted to contain a plurality of picture slides in stacked order, means in said magazine for biasing picture slides from one face of said magazine towards the opposite face thereof, a viewing compartment adjacent to said magazine, a slide withdrawal slot along an edge of one side of said magazine adjacent to said opposite face thereof and said viewing compartment for passage of a picture slide from said magazine into said viewing compartment, means including pads on the corners of said other face of said magazine for spacing the corners of a picture slide away from said opposite magazine face, means including a slightly raised ledge along the central portion of the edge of said withdrawal slot opposite to and facing said pads providing a transverse slot width at said ledge of not more than one and one-half times the thickness of a picture slide for limiting the withdrawal of slides sequentially from said magazine to a single slide while allowing passage through said slot of slightly bowed slides, the inner side of said raised ledge being tapered outwardly to facilitate outward passage of a slide, a slide return slot in said one side of said magazine along the edge thereof opposite said withdrawal slot, a slide mounting carriage in said viewing compartment, said slide mounting carriage having means for adjustably clamping a slide thereon for accommodating slides of different thicknesses, means for transferring single slides from said magazine through said withdrawal slot into viewing position on said mounting carriage, means for moving said mounting carriage transversely of said viewing compartment from slide viewing position to adjacent to said slide return slot in said magazine, and means for transferring a slide from said mounting carriage through said return slot into stacked positions in said magazine.

6. A picture viewer comprising a magazine adapted to contain a plurality of stacked picture slides, means including a pair of bowed leaf springs mounted for longitudinal extension and resultant variation in bowed depth thereof adjacent to the upper and lower edges of one inner face of said magazine for biasing picture slides from said one face of said magazine towards the opposite face thereof, said one face of said magazine having a pair of apertures adjacent to the upper edge and a second pair of apertures adjacent to the lower edge thereof with a guide slot extending between each pair of apertures, a pair of recesses on the opposite side of said one face from each of said pairs of apertures and communicating therewith, a stop formed on the bottom of each of said recesses, each of said bowed springs being formed with notches extending longitudinally thereof in an edge of said springs adjacent to each end thereof, each of said springs being mounted on said one face of said magazine with each of said notches arranged around a separate one of said stops in said recesses, said notches being relatively longer than the width of each of said stops whereby said ends of said bowed springs are longitudinally movable to provide for compression of said springs, a shallow groove along a part of each longitudinal edge of the top of said magazine, a slightly depressed surface on the outer side of said top co-extensive with said grooves, a transparent sheath, extending from side to side across said top co-extensive with said depressed surface and fitted thereover with inturned outer edges snapped into engagement with said shallow grooves for securely latching said transparent sheath under said top with the outer surface thereof substantially flush with the outer surface of said top, an index sheet securely clamped in sealed and viewable relation on said top under said transparent sheath, a viewing compartment adjacent to said magazine, a slide withdrawal slot along an edge adjacent to said viewing compartment for passage of a picture slide from said magazine into said viewing compartment, a slide return slot in said one side of said magazine along the edge thereof opposite said withdrawal slot, a slide mounting carriage in said viewing compartment, means for transferring single slides from said magazine through said withdrawal slot into viewing position on said mounting carriage, means for moving said mounting carriage transversely of said viewing compartment from slide viewing position to adjacent to said slide return slot in said magazine, and means for transferring a slide from said mounting carriage through said return slot into stacked position in said magazine.

7. A slide changer comprising a casing having a slide storage compartment, a magazine in said storage compartment for holding a plurality of stacked slides, resilient means on one face of said magazine for biasing stacked slides towards the opposite face of said magazine, a viewing compartment in said casing adjacent to said storage compartment, slide transfer means including a manual control and a slide holder movable transversely of said viewing compartment between a slide viewing position and a position for returning a slide to said magazine, said manual control comprising a control bar slidably movable between a slide viewing position and a position for returning a slide into said magazine and having a cam guide slot in one edge thereof with retaining stops at each end and a rocker seat substantially centrally thereof, a longitudinally extending rocker cam loosely seated in said guide slot and retained therein by a stop on each end thereof aligned with and engageable by said guide slot stops, a rocker on said cam adapted operatively to cooperate with said rocker seat, means including a leaf spring arranged between said cam and the outer edge of said guide slot for resiliently biasing said cam outwardly transversely of said slot, a notch in each end of the outer transverse edge of said rocker cam, means operatively connected to said slide holder and having a follower finger adapted to engage said outer transverse cam edge providing for rotation said offset crank arm during initial sliding movement of said control bar while said follower finger is engaged in one of said cam notches for moving said slide holder between slide viewing and slide return positions, said offset crank having arcuate follower surfaces on each side of said follower finger adapted to bias said rocker cam inwardly as said finger rotates said offset crank whereby said follower finger is disengaged from said cam notch after a predetermined travel corresponding to said transverse movement of said slide holder and remains stationary for all further movement of said control bar in the direction which initiated the movement, a shoulder on said cam adjacent to the notched end thereof which moves said slide holder into slide viewing position engageably by said follower finger to prevent a reverse movement of said control bar until completion of the full stroke of its sliding movement, a slide return slot in said magazine on the side thereof adjacent to said viewing compartment and abutting said opposite face thereof, means including a slide impelling finger connected to said control bar and adapted to extend into and to travel through said magazine for pushing a single slide out of said magazine from adjacent to said opposite face thereof into viewing position on said slide holder on movement of said control bar into slide viewing position and returnable outside of said magazine on movement of said control bar in its slide return travel, said slide transfer means including a spring cam for guiding said slide impelling finger in its travel through and outside of said magazine, a source of illumination for said slides, means responsive on operation of said control bar to slide viewing position for lighting said source of illumination, and means including a second slide impelling finger operable by said control bar for transferring a slide from said slide holder when in slide return position thereof to a stacked position in said magazine adjacent to said one face of said magazine.

8. A slide viewer comprising a casing having a slide storage compartment, magazine in said storage compartment for holding a plurality of stacked slides, resilient means on one face of said magazine for biasing stacked slides towards the opposite face of said magazine, a viewing compartment in said casing adjacent to said storage compartment, slide transfer means including a manual control and a slide holder movable transversely of said viewing compartment between a slide viewing position and a position for returning a slide to said magazine, said manual control comprising a control bar slidably movable between a slide viewing position and a position for returning a slide into said magazine and having a cam guide slot in one edge thereof with retaining stops at each end and a rocker seat substantially centrally thereof, a longitudinally extending rocker cam loosely seated in said guide slot and retained therein by a stop on each end thereof aligned with and engageable by said guide slot stops, a rocker on said cam adapted operatively to cooperate with said rocker seat, means including a leaf spring arranged between said cam and the outer edge of said guide slot for resiliently biasing said cam outwardly transversely of said slot, a notch in each end of the outer transverse edge of said rocker cam, means including a Scotch yoke operatively connected to said slide holder through a pivotally mounted offset crank follower having a follower finger adapted to engage said outer transverse cam edge providing for rotating said offset crank arm during initial sliding movement of said control bar while said follower finger is engaged in one of said cam notches for moving said slide holder between slide viewing and slide return positions, said offset crank having arcuate follower surfaces on each side of said follower finger adapted to bias said rocker cam inwardly as said finger rotates said offset crank whereby said follower finger is disengaged from said cam notch after a predetermined travel corresponding to said transverse movement of said slide holder and remains stationary for all further movement of said control bar in the direction which initiated the movement, a shoulder on said cam adjacent to the notched end thereof which moves said slide holder into slide viewing position engageable by said follower finger to prevent a reverse movement of said control bar until completion of the full stroke of its sliding movement, a slide return slot in said magazine on the side thereof adjacent to said viewing compartment and abutting said opposite face thereof, means including a second crank pivotally mounted on said control bar and having a slide impelling finger adapted to extend into and to travel through said magazine for pushing a single slide out of said magazine from adjacent to said opposite face thereof into viewing position on said slide holder on movement of said control bar into slide viewing position and returnable outside of said magazine on movement of said control bar in its slide return travel, said slide transfer means including a spring cam and a follower on said second crank adapted to be biased resiliently around said spring cam surface on movement of said control bar for guiding said slide impelling finger in its travel through and outside of said magazine, a source of illumination for said slides, means responsive to operation of said control bar to slide viewing position for lighting said source of illumination, and means including a second slide impelling finger operable by said control bar for transferring a slide from said slide holder when in slide return position thereof to a stacked position in said magazine adjacent to said one face of said magazine.

9. A magazine for a slide viewer adapted to contain a plurality of stacked picture slides, means in said magazine for biasing picture slides from one face of said magazine towards the opposite face thereof, a slide withdrawal slot along an edge of one side of said magazine adjacent to said opposite face thereof, means including pads on the said opposite face of said magazine for spacing the picture slide away from said opposite face of said magazine, means including a slightly raised ledge along a portion of the edge of said withdrawal slot opposite to and facing said pads providing a transverse slot width at said ledge of not more than one and one-half times the thickness of a picture slide for limiting the withdrawal of slides from said magazine sequentially to a single slide while allowing passage through said slot of slightly bowed slides, a slide return slot in said one side of said magazine along the edge thereof opposite said withdrawal slot, and a slot across said opposite face of said magazine at right angles to said withdrawal slot to permit the entry of a picture slide engaging finger into said magazine.

10. A magazine for a slide viewer adapted to contain a plurality of stacked picture slides with the side edges thereof aligned on the two sides of said magazine and the top and bottom edges thereof aligned respectively on the top and bottom of said magazine, means including a pair of bowed leaf springs mounted for longitudinal extension and resultant variation in bowed depth thereof adjacent to the upper and lower edges of one inner face of said magazine for biasing picture slides from said one face of said magazine towards the opposite face thereof, said one face of said magazine having a pair of apertures adjacent to the upper edge and a second pair of apertures adjacent to the lower edge thereof, a pair of recesses on the opposite side of said one face from each of said pairs of apertures and communicating therewith, a stop formed on the bottom of each of said recesses, each of said bowed springs being formed with notches extending longitudinally thereof in an edge of said springs adjacent to each end thereof, each of said springs being mounted on said one face of said magazine with each of said notches arranged around a separate one of said stops in said recesses, said notches being relatively longer than the width of each of said stops whereby said ends of said bowed springs are longitudinally movable to provide for compression of said springs, a slide withdrawal slot along an edge of one side of said magazine adjacent to said opposite face thereof, means including pads on the opposite face of said magazine for spacing the corners of a picture slide away from said opposite magazine face, means including a slightly raised ledge along a portion of the edge of said withdrawal slot opposite to and facing said pads providing a transverse slot width at said ledge of not more than one and one-half times the thickness of a picture slide for limiting the withdrawal of slides from said magazine sequentially to a single slide while allowing passage through said slot of slightly bowed slides, a slide return slot in said one side of said magazine along the edge thereof opposite said withdrawal slot, and a slot across said opposite face of said magazine at right angles to said withdrawal slot to permit the entry of a picture slide engaging finger into said magazine.

11. A magazine for a slide viewer adapted to contain a plurality of stacked picture slides with the side edges thereof aligned on the two sides of said magazine and the top and bottom edges thereof aligned respectively on the top and bottom of said magazine, means including a pair of bowed leaf springs mounted for longitudinal extension and resultant variation in bowed depth thereof adjacent to the upper and lower edges of one inner face of said magazine for biasing picture slides from said one face of said magazine towards the opposite face thereof, said one face of said magazine having a pair of apertures adjacent to the upper edge and a second pair of apertures adjacent to the lower edge thereof with a guide slot extending between each pair of apertures, a pair of recesses on the opposite side of said one face from each of said pairs of apertures and communicating therewith, a stop formed on the bottom of each of said recesses, each of said bowed springs being formed with notches extending longitudinally thereof in an edge of said springs adjacent to each end thereof, each of said springs being mounted on said one face of said magazine with each of said notches arranged around a separate one of said stops in said recesses, said notches being relatively longer than the width of each of said stops whereby said ends of said bowed springs are longitudinally movable to provide for compression of said springs, a shallow groove along a part of each longitudinal edge of the top of said magazine, a slightly depressed surface on the outer side of said top co-extensive with said grooves, a transparent sheath, extending from side to side across said top co-extensive with said depressed surface and fitted thereover with inturned outer edges snapped into engagement with said shallow grooves for securely latching said transparent sheath under said top with the outer surface thereof substantially flush with the outer surface of said top, an index sheet securely clamped in sealed and viewable relation on said top under said transparent sheath, a slide withdrawal slot along an edge of one side of said magazine adjacent to said opposite face thereof, means including pads on the corners of said opposite face of said magazine for spacing the corners of a picture slide away from said opposite magazine face, means including a slightly raised ledge along the central portion of the edge of said withdrawal slot opposite to and facing said pads providing a transverse slot width at said ledge of not more than one and one-half times the thickness of a picture slide for limiting the withdrawal of slides from said magazine sequentially to a single slide while allowing passage through said slot of slightly bowed slides, a slide return slot in said one side of said magazine along the edge thereof opposite said withdrawal slot.

12. The picture viewer as claimed in claim 1 which further comprises illuminating means for said viewing compartment, said illuminating means being normally biased towards an off position and being operatively connected to said slide transfer means whereby it is automatically illuminated when a slide is moved to the viewing position and is extinguished by the operation of said biasing means on the release of said slide transferring means.

References Cited in the file of this patent
UNITED STATES PATENTS

| | | |
|---|---|---|
| 1,073,331 | Colardeau et al. | Sept. 16, 1913 |
| 2,513,102 | Parlini | June 27, 1950 |
| 2,516,793 | Mueller | July 25, 1950 |
| 2,533,441 | Estes | Dec. 12, 1950 |
| 2,562,185 | Gross | July 31, 1951 |
| 2,580,164 | Flynn | Dec. 25, 1951 |
| 2,606,263 | Woodward | Aug. 5, 1952 |
| 2,617,218 | Antos | Nov. 11, 1952 |
| 2,645,869 | Cook | July 21, 1953 |
| 2,699,091 | McLead et al. | Jan. 11, 1955 |
| 2,705,437 | Lessman | Apr. 5, 1955 |